United States Patent
Takada et al.

(10) Patent No.: US 7,984,245 B2
(45) Date of Patent: Jul. 19, 2011

(54) STORAGE SYSTEM, STORAGE SUBSYSTEM AND STORAGE CONTROL METHOD

(75) Inventors: Ryu Takada, Odawara (JP); Yoshihito Nakagawa, Ooi (JP)

(73) Assignee: Hitachi, Ltd., Tokyo (JP)

( * ) Notice: Subject to any disclaimer, the term of this patent is extended or adjusted under 35 U.S.C. 154(b) by 517 days.

(21) Appl. No.: 12/222,769

(22) Filed: Aug. 15, 2008

(65) Prior Publication Data

US 2009/0307429 A1 Dec. 10, 2009

(30) Foreign Application Priority Data

Jun. 6, 2008 (JP) .................. 2008-149831

(51) Int. Cl.
G06F 12/02 (2006.01)
G06F 12/16 (2006.01)

(52) U.S. Cl. ........ 711/141; 711/144; 711/145; 711/162; 711/165

(58) Field of Classification Search .................. 711/141, 711/144, 145, 161, 162, 165
See application file for complete search history.

(56) References Cited

U.S. PATENT DOCUMENTS

| | | | |
|---|---|---|---|
| 7,111,138 B2 | 9/2006 | Higaki et al. | |
| 7,444,478 B2 * | 10/2008 | LaFrese et al. | 711/143 |
| 7,467,275 B2 * | 12/2008 | Sakashita et al. | 711/165 |
| 7,539,815 B2 * | 5/2009 | Zohar et al. | 711/112 |
| 7,769,960 B2 * | 8/2010 | LaFrese et al. | 711/143 |
| 2006/0294301 A1 * | 12/2006 | Zohar et al. | 711/113 |
| 2007/0239954 A1 * | 10/2007 | Sakashita et al. | 711/165 |
| 2007/0271307 A1 * | 11/2007 | Bergsten | 707/200 |
| 2009/0199041 A1 * | 8/2009 | Fukui et al. | 714/6 |

* cited by examiner

*Primary Examiner* — Jack A Lane
(74) *Attorney, Agent, or Firm* — Stites & Harbison PLLC; Juan Carlos A. Marquez, Esq.

(57) ABSTRACT

Proposed is a storage system capable of preventing the compression of a cache memory caused by data remaining in a cache memory of a storage subsystem without being transferred to a storage area of an external storage, and maintaining favorable I/O processing performance of the storage subsystem. In this storage system where an external storage is connected to the storage subsystem and the storage subsystem provides a storage area of the external storage as its own storage area, provided is a volume for saving dirty data remaining in a cache memory of the storage subsystem without being transferred to the external volume. The storage system recognizes the compression of the cache memory, and eliminates the overload of the cache memory by saving dirty data in a save volume.

12 Claims, 24 Drawing Sheets

FIG.3

| EXTERIOR VOL# | CAPACITY | PATH INFORMATION ||||| STORAGE SUBSYSTEM |||||||
|---|---|---|---|---|---|---|---|---|---|---|---|---|
| | | PATH MODE | PORT | PRIORITY | PATH CONDITION | PATH NUMBER | VENDER | APPARATUS NAME | APPARATUS SERIAL NUMBER | LDEV | WWN | LUN |
| 1 | | Single | 0 | Hi | NORMAL | 2 | AAAAA | XXX | 000001 | 1 | 00 | 0 |
| | | | 1 | Low | NORMAL | | | | | | 01 | 1 |
| 2 | | Single | 0 | Hi | NORMAL | 2 | | | | 2 | 00 | 0 |
| | | | 1 | Low | NORMAL | | | | | | 01 | 1 |
| 3 | | Multi | 2 | - | NORMAL | 1 | BBBBB | YYY | 000002 | 3 | 10 | 0 |
| 4 | | Multi | 2 | - | NORMAL | 2 | | | | 4 | 10 | 1 |
| | | | 3 | - | NORMAL | | | | | 4 | 11 | 0 |
| 5 | | Multi | 2 | - | NORMAL | 2 | | | | 5 | 10 | 2 |
| | | | 3 | - | NORMAL | | | | | 5 | 11 | 1 |

400

- CACHE USAGE DETECTION PROGRAM
- PATH CONDITION DETECTION PROGRAM
- DATA TRANSFER PROGRAM
- OTHER MANAGEMENT PROGRAM

| EXTERIOR VOL# | AFFILIATED GROUP# | SAVE UPON PATH DISCONNECTION | CACHE USAGE | CACHE USAGE THRESHOLD VALUE (%) | SAVE DESTINATION |
|---|---|---|---|---|---|
| 1 | α | | | | |
| 2 | α | | | | |
| 3 | – | | | | |
| : | – | | | | |
| n | – | | | | |

FIG.6

| CHECK COLUMN | EXTERIOR VOL# | CAPACITY | PATH MODE | PATH COUNT | VENDER | APPARATUS NAME | APPARATUS SERIAL NUMBER |
|---|---|---|---|---|---|---|---|
| ☐ | 1 | | Single | 2 | AAAAA | XXX | 000001 |
| ☐ | 2 | | Single | 2 | AAAAA | XXX | 000001 |
| ☐ | 3 | | Multi | 1 | BBBBB | YYY | 000002 |
| ☐ | 4 | | Multi | 2 | BBBBB | YYY | 000002 |
| ☐ | 5 | | Multi | 2 | BBBBB | YYY | 000002 |

| GROUP# | SAVE UPON PATH DISCONNECTION | CACHE USAGE | CACHE USAGE THRESHOLD VALUE (%) | SAVE DESTINATION |
|---|---|---|---|---|
| α | | | | |
| β | | | | |
| : | | | | |
| : | | | | |
| ω | | | | |

FIG.11

| LDEV# | PATH DEFINITION | SAVE DESTINATION SETTING | APPARATUS SERIAL NUMBER | PATH DEFINED IN LDEV OF SAME ECC GROUP | PATH MODE |
|---|---|---|---|---|---|
| 1 | | | | | |
| 2 | | | | | |
| 3 | | | | | |
| : | | | | | |
| n | | | | | |

| # | LDEV# |
|---|---|
| 0 | |
| 1 | |
| ⋮ | |
| ⋮ | |
| n | |

| EXTERIOR VOL# | PATH MODE | PATH COUNT | REMAINING PATH COUNT |
|---|---|---|---|
| 1 | Multi | 3 | 3 |
| 2 | Multi | 1 | 1 |
| 3 | Single | 3 | 3 |
| : | | | |
| n | | | |

| MANAGEMENT# | LDEV# | SAVE DESTINATION# |
|---|---|---|
| 1 | | |
| 2 | | |
| 3 | | |
| : | | |
| n | | |

STORAGE SYSTEM, STORAGE SUBSYSTEM AND STORAGE CONTROL METHOD

CROSS-REFERENCES

This application relates to and claims priority from Japanese Patent Application No. 2008-149831, filed on Jun. 6, 2008, the entire disclosure of which is incorporated herein by reference.

BACKGROUND

The present invention generally relates to a storage system, and in particular relates to a storage system in which an external storage is connected to a storage subsystem.

In order to deal with a system environment that changes suddenly due to the increase in the data amount or traffic volume, a storage subsystem loaded with a virtualization function is known. As a result of connecting an external storage to the storage subsystem, the storage subsystem is able to provide, based on this virtualization function, its own storage area and a storage area of the external storage as a single storage pool to a user through virtualization.

As conventionally technology related to this kind of storage subsystem, for instance, U.S. Pat. No. 7,111,138 describes a storage system in which a second storage subsystem is externally connected to a first storage subsystem. More specifically, the first storage subsystem comprises a virtual volume mapped with a real volume of the second storage system. The write data sent from a host apparatus to a virtual volume is transferred from the first storage subsystem to the second storage subsystem, and stored in the real volume mapped to the virtual volume.

SUMMARY

With the conventional storage system described above, there is a problem in that data that is not transferred to the external storage is accumulated in the cache memory of the storage subsystem when the external storage is overloaded due to write processing being performed to the external storage at high frequency or when a communication failure occurs between the storage subsystem and the external storage due to maintenance of the external storage or a path failure to the external storage. Consequently, this will cause an overload in the cache memory and deteriorate the I/O processing performance from the host apparatus to the storage subsystem.

Thus, an object of the present invention is to provide a storage system where an external storage is connected to a storage subsystem and the storage subsystem provides a storage area of the external storage as its own storage area. Consequently, this storage system is capable of preventing the compression of a cache memory caused by data remaining in a cache memory of a storage subsystem without being transferred to a storage area of the external storage, and maintaining favorable I/O processing performance of the storage subsystem.

In order to achieve the foregoing object, the present invention provides a storage system where an external storage is connected to a storage subsystem and the storage subsystem provides a storage area of the external storage as its own storage area. This storage system comprises a volume for saving dirty data remaining in a cache memory of the storage subsystem without being transferred to the external volume. The storage system recognizes the compression of the cache memory, and eliminates the overload of the cache memory by saving dirty data in a save volume.

According to the present invention as described above, it is possible to provide a storage system where an external storage is connected to a storage subsystem and the storage subsystem provides a storage area of the external storage as its own storage area, and which is consequently capable of preventing the compression of a cache memory caused by data remaining in a cache memory of a storage subsystem without being transferred to a storage area of the external storage, and maintaining favorable I/O processing performance of the storage subsystem.

DESCRIPTION OF DRAWINGS

FIG. 3 is a management table of an external volume;

FIG. 6 is a table for defining a group of save source external volumes;

FIG. 11 is a management table of all LDEVs to become a save destination candidate;

DETAILED DESCRIPTION

Figure 1:
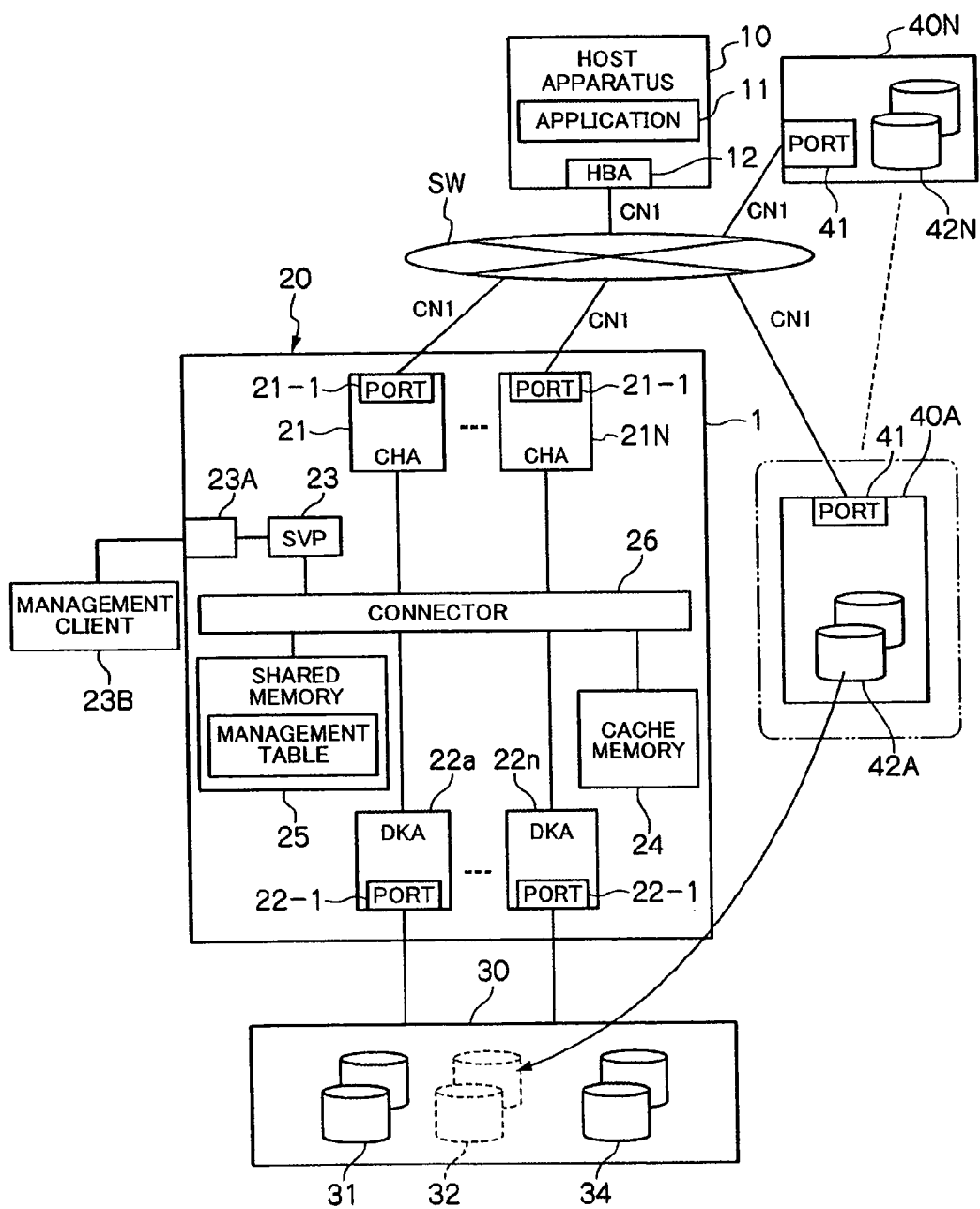
FIG. 1 is a block diagram of a storage system according to the present invention.

An embodiment of the present invention is now explained with reference to the attached drawings. FIG. 1 is a block diagram of a storage system according to the present invention. The storage system is configured by external storage subsystems (40A . . . 40N) being externally connected to a primary storage subsystem 20 to be connected to a host apparatus 10.

An external connection refers to a method of the primary storage subsystem showing an external storage to a host apparatus as though the external storage is its own storage area. Specifically, the primary storage subsystem 20 provides a virtual volume 32 to the host apparatus 10, and maps a logical volume 42A of the external storage subsystem 40A to the virtual volume 32. Thus, the primary storage subsystem 20 acts as though the storage area 42A of the first external storage subsystem is its own storage area to the host apparatus 10.

The host apparatus 10 as a host system is a computer device comprising information processing resources such as a CPU (Central Processing Unit) and a memory, and is configured as a personal computer, a workstation, a mainframe or the like.

The host apparatus 10 comprises an information input device such as a keyboard, a switch, a pointing device or a microphone, and an information output device such as a monitor display or a speaker.

The host apparatus 10 also comprises an application program 11 such as database software that uses the storage areas (31, 32) provided by the primary storage subsystem 20, and an adapter 12 for accessing the primary storage subsystem 20 via a communication network CN1 comprising a switch circuit SW.

The communication network CN1 is a LAN, a SAN, Internet, a dedicated line, a public line or the like. Data communication via a LAN is conducted according to a TCP/IP (Transmission Control Protocol/Internet Protocol) protocol or the like. If the host apparatus 10 is to be connected to the primary storage subsystem 20 via a LAN, the host apparatus 10 designates a file name and requests the input and output of data to the primary storage subsystem 20 in file units.

Meanwhile, if the host apparatus 10 is to be connected to the primary storage subsystem 20 via a SAN, the host apparatus 10 requests the input and output of data in units of a block, which is a data management unit of a storage area provided by a plurality of storage devices, according to a fibre channel protocol.

If the communication network CN1 is a LAN, the adapter 12 will be a LAN-compatible network card. If the communication network CN1 is a SAN, the adapter 12 will be a host bus adapter or the like.

The switch circuit SW is configured from a router or a switchboard connected to the communication network. The switch circuit SW connects a port 21-1 of the channel adapter 21 and an HBA 12 of the host apparatus 10, connects a port 21-1 of a port 21A of the channel adapter and a port 41 of the first external storage subsystem 40A, . . . , and connects a port 21-1 of the channel adapter 21N and a port 41 of the Nth external storage subsystem 40N.

A plurality of external storage subsystems exist as described above, and they respectively comprise a volume 42 (42A . . . 42N). Since these volumes exist externally when viewed from the primary storage subsystem 20, they are hereinafter referred to as "external volumes," and will be differentiated from the internal volumes 31 of the primary storage subsystem 20.

The primary storage subsystem 20 is configured from a disk array subsystem or the like. The same applies to the external storage subsystems 40A . . . 40N. Let it be assumed that the external storage subsystems comprise the same components as the primary storage subsystem.

The host apparatus 10 is connected to a target port of the channel adapter 21. The port of the channel adapters 21A . . . 21N to which the external storage subsystem is connected is either an external port or an initiator port. A target port of the external storage subsystem is connected to the communication network CN1.

The primary storage subsystem 20 can be broadly classified into a controller unit 1 and a storage apparatus unit 30, and the controller unit 1 comprises the foregoing plurality of channel adapters (CHA) 21 . . . 21N, a plurality of disk adapters (DKA) 22a . . . 22n, a service processor (SVP) 23, a cache memory 24, a shared memory 25, and a connector 26.

Each of the channel adapters CHA 21 is configured as a micro computer system comprising a microprocessor and a local memory, and interprets and executes the various commands sent from the host apparatus 10. The channel adapters CHA 21A . . . 21N are also configured the same. The external volume 42A . . . 42N of each of the plurality of external storage subsystems 40A . . . 40N is mapped to the virtual volume 32, and used by the primary storage subsystem 20 as a volume for storing data sent from the host apparatus 10 to the virtual volume 32, or as a volume for saving dirty data existing in the cache memory 24.

A network address (for instance, an IP address or WWN) is allocated to the port 21-1 of the channel adapter 21 . . . 21N for identifying the respective ports 21-1. If there are a plurality of host apparatuses, the channel adapter is provided to each host apparatus. FIG. 1 shows an example where there is one host apparatus 10. N-number (42A . . . 42N) of external storage subsystems are connected to the primary storage subsystem 20.

When the channel adapter 21 receives a read command from the host apparatus 10, it stores a read command in the shared memory 25. The disk adapters (DKA) 22a . . . 22n are constantly monitoring the shared memory 25 and, upon discovering an unprocessed read command, reads data from a hard disk device (HDD) as a storage device of the storage apparatus 30, and temporarily stores such data in the cache memory 34. The CHA 21 reads data staged to the cache memory 24 and sends such data to the host apparatus 10 that sent the command.

When the CHA 21 receives a write command from the host apparatus 10, the CHA stores a write command in the shared memory 25, temporarily stores the received data in the cache memory 24, and notifies the host apparatus 10 that sent the command that the writing of data is complete.

The write data sent to the real volume 31 in the primary storage subsystem 20 is written from the cache memory 24 into a storage area of the internal volume 31 by the DKA asynchronously with the write command (destaging).

The write data sent to the virtual volume 32 pursuant to the write command from the host apparatus is transferred from the cache memory 24 to the target external volume among the external volumes 42A to 42N by the CHA without being written into the storage apparatus 30 (destaging).

If a read command is issued from the host apparatus to the virtual volume 32, the CHA transfers the read-target data from the target external volume to the cache memory 24 (staging).

The DKA controls the sending and receiving of data to and from a plurality of storage devices of the storage apparatus 30. A logical volume 31 is a volume corresponding to a storage area of a storage device such as a hard disk drive.

The logical volume 31 is a volume to which a real storage area of the storage apparatus 30 is allocated. The virtual volume 32 is a virtual volume to which a real storage area of the storage apparatus 30 is not allocated.

The host apparatus 10 recognizes the virtual volume 32 and issues a write command or a read command to such virtual volume 32. However, write data is written into the target external volume(s) (one or more among external volumes 42A . . . 42N) mapped to the virtual volume 32, and read data is read from the target external volume.

Each of the disk adapters DKA 22a . . . 22n is configured as a micro computer system comprising a microprocessor, a memory and the like. A DKA converts a logical address included in a command from a host apparatus into a physical address to access the storage device. The DKA performs disk access according to a RAID configuration if the storage area of the storage apparatus 30 is managed according to RAID. A plurality of storage devices are connected to each DKA.

Each DKA is constantly monitoring the status of the storage device, and the monitoring result is sent to the SVP (service processor) 23. The SVP is connected to a management client 23B via a port 23A. A management client is a personal computer loaded with a management program under the JAVA (registered trademark) applet or the like. The management client supplies the input from the administrator to the SVP.

The SVP is used for setting and defining various management tables for allowing the CHA and the DKA to refer to configuration information such as the volume definition and path definition of the primary storage subsystem 20. The SVP 23 additionally executes processing for monitoring the occurrence of a failure in the components in the primary storage subsystem 20 and displaying such failure on a management client.

The SVP further sets one or more external volumes to be mapped to the virtual volume, and sets this as a mapping table. The SVP 23 performs processing for defining, in a management table, a save volume for saving data that is accumulated as dirty data without being destaged to the external volumes from the cache memory 24.

FIG. 1 shows an internal save volume 34 set in the primary storage subsystem 20. The SVP sets one or more external volumes as the save destination external volume. Incidentally, the external volume to be mapped to the virtual volume is hereinafter referred to as a "save source external volume" for differentiation from the save destination external volume. Various management tables are stored in the shared memory 25.

Since a plurality of channel adapters CHA and a plurality of disk adapters DKA are able to mutually refer to commands and management tables via the shared memory 25, processing that is mutually related or cooperative is enabled.

The connector 26 mutually connects the respective channel adapters 21, the respective disk adapters 22, the SVP 23, the cache memory 24, and the shared memory 25. The connector 26 is configured, for instance, as a high-speed bus such as an ultrafast crossbar switch that performs data transmission by way of high-speed switching.

Although a hard disk drive (HDD) is primarily used as the storage device configuring the storage apparatus 30, a solid-state drive such as a flash memory, a magnetic tape, an optical disk and other devices may also be used. In addition, different types of disks such as a FC (Fibre Channel) disk and a SATA (Serial AT Attachment) disk may coexist in the storage apparatus 30.

The host apparatus 10 and the external storage subsystems 40A . . . 40N can be directly connected to the primary storage subsystem 20.

WWN as unique identifying information is allocated to the port 41 of the external storage subsystems 40A . . . 40N, and a LUN number is associated with the logical volumes 42A . . . 42N of the external storage subsystem. Thus, by combining the WWN and the LUN number, a logical path can be set from the primary storage subsystem 20 to the target external volume.

From the perspective of clarifying the subject of executing the flowcharts explained later, let it be assumed that the external volumes 42A, 42B of the external storage subsystems 40A and 40B are the save source external volumes, and the volume 42N of the external storage subsystem 40N is the save destination external volume. The CHA 21A is connected to the external storage subsystem 40A, the CHA 21B is connected to the external storage subsystem 40B, and the CHA 21N is connected to the external storage subsystem 40N.

Figure 2:
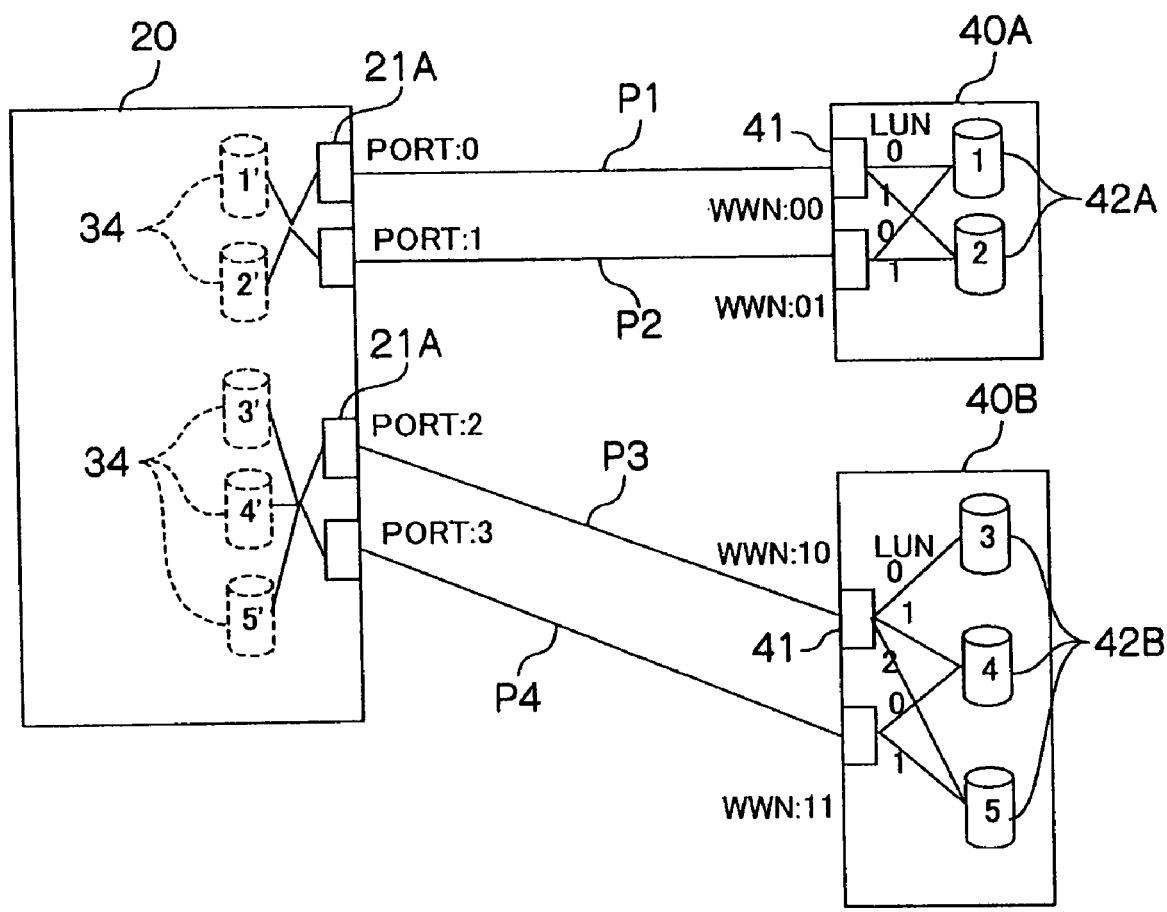
FIG. 2 is a block diagram showing a status where a save source external volume of an external storage subsystem is mapped to a virtual volume.

FIG. 2 is a block diagram showing a status where the save source external volume 42A of the external storage subsystem 40A and the save source external volume 42B of the external storage subsystem 40B are respectively mapped to the virtual volume 34 of the primary storage subsystem 20.

An external volume 42A(1) is mapped to a virtual volume 1', an external volume 42A(2) is mapped to a virtual volume 2', and external volumes 42B(3) to (5) are similarly mapped respectively to virtual volumes 3' to 5' of the primary storage subsystem 20. As described above, this relationship is set as a mapping table in the shared memory 25 via the SVP 23.

The management client 23B sets a logical between the primary storage subsystem 20 and the external storage subsystem 40A, and between the primary storage subsystem 20 and the external storage subsystem 40B via the SVP 23. The path definition information is registered in the shared memory 25.

In FIG. 2, the virtual volume 1' is connected to a port 0 and a port 1, a path P1 is set between the port 0 and a port (WWN: 00) of the external storage subsystem, and a path P2 is set between the port 1 and a port (WWN: 01).

Moreover, the port (WWN: 00) is connected to a LUN 0 and a LUN 1, the LUN 0 is connected to an external volume 1, and the LUN 1 is connected to an external volume 2. The port (WWN: 01) is connected to the LUN 0 and the LUN 1, the LUN 0 is connected to the external volume 1, and the LUN 1 is connected to the external volume 2.

An alternate path structure between the primary storage subsystem 20 and the external storage subsystem 40A is realized with the path P1 and the path P2. The same applies to the paths P3 and P4. The primary storage subsystem 20 is able to transfer the write data, which is to be written into the virtual volume 1', to the target external volume 1 via either the path P1 or the path P2. The same applies to the virtual volume 2'.

The path mode of the path P1 and the path P2 is a single mode. A path mode is a method of operating the path, and a single path mode is a mode in which one path with the highest priority is used for the data communication even if an alternate path is set. If a high-priority path is restricted due to maintenance of the external storage subsystem or a path failure, a low-priority path replaces the high-priority path and is used for the data communication.

The virtual volumes 3' to 5' are as shown in FIG. 2. The path P3 and the P4 are operated in a multi mode. A multi mode is a mode where data communication is performed by simultaneously using a plurality of paths from a plurality of ports by balancing the load. The path mode is decided based on the type of the external storage subsystem 40A, 40B connected to the primary storage subsystem 20.

The transfer of data between the virtual volume and the save source external volume or the save destination external volume is executed via the cache memory 24.

Although FIG. 2 shows a case where the primary storage subsystem 20 is connected to the transfer source external volume, the same applies to a case where the primary storage subsystem 20 is connected to the transfer destination external volume.

FIG. 3 is a management table of external volumes. The primary storage subsystem 20 issues a SCSI-standard Inquiry command to the external storage subsystems 40A . . . 40N. The primary storage subsystem 20 decides the path mode, vendor name, apparatus name, serial number, LDEV number, WWN, and LUN based on the reply to such command, and registers this information in a management table for each external volume number (#). The external volume management table is registered in the shared memory 25.

The administrator is able to set the save source external volume and the save destination external volume from the external volumes shown in FIG. 3. The save source external volume is registered in the virtual volume mapping table. The save destination external volume is registered in a management table described later as a save destination volume. The management table of FIG. 3 is indicated to match the block diagram of FIG. 2.

The situation of data sent from the host apparatus 10 to the virtual volume 32 compressing the cache memory 24 is now explained. This compression will or may arise in the following cases.

The first case is a case where the I/O to the save source external volume of the external storage subsystem occurs at a high frequency (overload status of the save source external volume), and data sent from the host apparatus 10 to the virtual volume 32 is accumulated as dirty data in the cache memory 24 exceeding a threshold value. The I/O frequency to the save source external volume may also be measured to determine its overload status.

The second case is a case where a path failure such as a path disconnection occurring between the primary storage subsystem 20 and the external storage subsystems 40A . . . 40N. In this case also, data sent from the host apparatus 10 to the virtual volume 32 is accumulated as dirty data in the cache memory 24 since it could not be transferred from the cache memory 24 to the save source external volume.

The third case is a case where a storage device such as an HDD corresponding to the save source volume of the external storage subsystem is to be blocked.

Figures 4, 5:
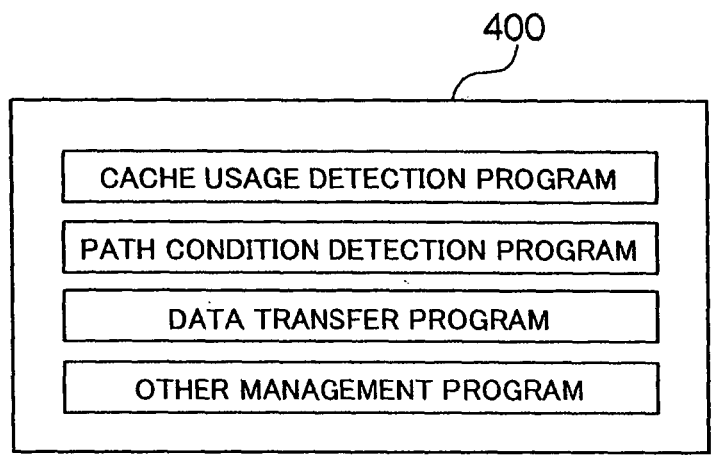
FIG. 4 is a block diagram of a local memory in a CHA.
FIG. 5 is a management table of a save source external volume.

As shown in FIG. 4, the local memory 400 of the CHA (and the local memory of the DKA as necessary) stores a cache utilization detection program for detecting the capacity (cache utilization) of the cache memory occupied by the dirty data that was not transferred from the virtual volume 32 to the save source external volumes 42A, 42B (refer to FIG. 2), a path status detection program for detecting the path status between the primary storage subsystem and the external storage subsystem, a data transfer control program for controlling the transfer of data between the cache memory and the save source external volume or the save destination external volume, and other various management programs for implementing the flowcharts described later.

The management client 23B sets via the SVP 23 a condition for saving the dirty data, which is remaining in the cache memory without being saved to the save source external volume, to a save volume regarding the respective save source external volume. FIG. 5 shows a management table for setting such a condition. In FIG. 5, the external volume # coincides with the save source external volume # of FIG. 3.

When saving data upon a path disconnection to the save source external volume, a flag signifying this is set in the column of "save upon path disconnection." The column of "cache memory utilization threshold value (%)" records information on whether or not to save dirty data when the amount of dirty data occupies a certain percentage (%) of the cache memory as the amount of utilization. The column of "save destination" registers the address and identifying information of the save volume. As the save volume, there are the internal volumes in the primary storage subsystem 20 and the save destination external volume in the external storage subsystems.

The column of "cache utilization" shows the capacity of the cache memory occupied by the dirty data. The microprocessor of the CHA connected to the save source external volume periodically calculates the cache utilization and registers this in the save source external volume management table (FIG. 5). The columns of "save upon path disconnection" and/or "cache memory utilization threshold value (%)" in FIG. 5 are examples of the save conditions. In addition, blockage of the HDD and the I/O frequency to the save source external volume can also be set as the save conditions.

The status of dirty data being accumulated in the cache memory often occurs in external apparatus units of the save source external volume. Thus, it is desirable to group the plurality of save source external volumes and decide uniform save conditions.

FIG. 6 is a table for defining a group of save source external volumes, and is an operation screen to be displayed on the management client. The SVP 23 creates a group definition table by referring to the external volume management table of FIG. 3 existing in the shared memory 25, and provides this to the management client. FIG. 6 shows that the save source external volume 1 and the save source external volume 2 are volumes of the same apparatus. The save source external volumes 3 to 5 are also shown to be of the same apparatus.

In FIG. 6, when the administrator clicks a check column of a plurality of volumes of the same apparatus, the SVP groups such plurality of volumes.

Figures 7, 8:
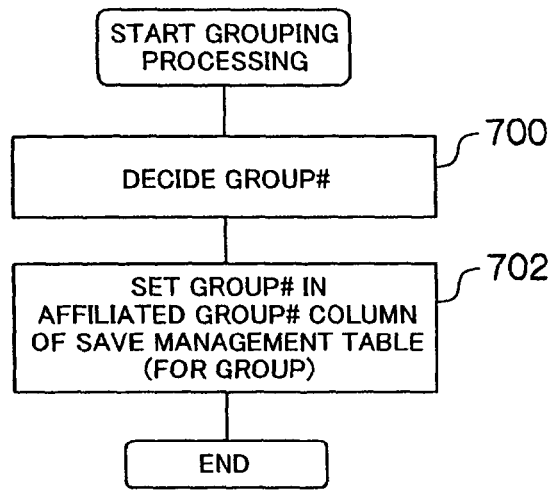
FIG. 7 is a flowchart to be executed by an SVP for grouping a plurality of save source external volumes.
FIG. 8 is a group management table of save source external volumes.

FIG. 7 is a flowchart to be executed by the SVP for grouping a plurality of save source external volumes. The management client inputs volumes 1 and 2 as the first group and volumes 3 to 5 as the second group in the display screen shown in FIG. 6. The SVP decides the group # based on the input information (FIG. 7; step 700).

The SVP adds a new entry to the group # column of the group management table of the save source external volume pertaining to FIG. 8, and sets a group # ($\alpha$, $\beta$ . . . ) thereto (702).

The table of FIG. 8 includes, as with the table of FIG. 5, columns concerning the necessity of save upon path disconnection, cache utilization, cache utilization threshold value, and save destination. The cache utilization and the threshold value show the total value of all save source external volumes belonging to the group. One or more volumes are set as the save destination of FIG. 5 and FIG. 8.

When the management client inputs information in these columns in the table of FIG. 8, the SVP automatically reflects the input result to individual save source external volumes of the management table of FIG. 5. For instance, the cache utilization threshold value of the group is distributed evenly to a plurality of save source external volumes belonging to the group or unevenly in consideration of the capacity of the respective save source external volumes. The column of "behavior upon path disconnection" to the group is similarly set to the respective transfer source external volumes. The same applies to the save destination.

In FIG. 6, when the administrator selects a serial number, the volumes belonging to that apparatus will be grouped. As described above, the administrator is able to simplify the setting of the save conditions to the respective save source external volumes by grouping the save source external volumes and setting the save conditions such as the threshold value of cache utilization.

Figure 9:
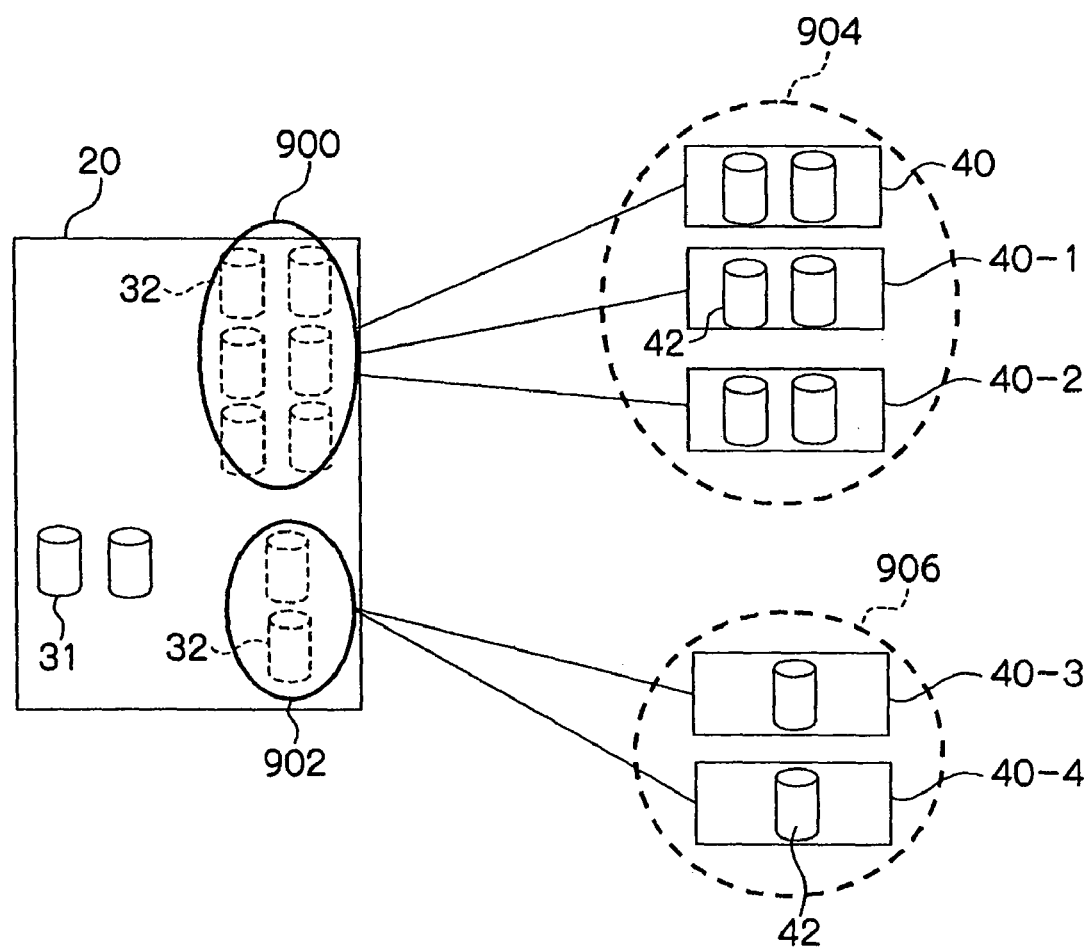
FIG. 9 is a block diagram of a storage system showing another embodiment of grouping save source external volumes.

FIG. 9 is a block diagram of a storage system showing another embodiment of grouping the save source external volumes. This embodiment shows a case where a plurality of external volumes are grouped across different external apparatuses.

FIG. 9 shows a group 904 of a plurality of volumes 42 belonging to the external apparatuses 40, 40-1, 40-2, and a group 906 of a plurality of external volumes belonging to the external apparatuses 40-3, 40-4. FIG. 9 also shows a group 900 of a plurality of virtual volumes 32 associated with a plurality of external volumes of the group 904, and a group 902 of a plurality of virtual volumes 32 associated with a plurality of external volumes of the group 906.

The primary storage subsystem 10 comprises a virtual volume 32 and a real volume 31. The real volume 31 stores data with high access frequency. Each of the external storage subsystems 40, 40-1, 40-2 belonging to the group 904 is a low-end storage subsystem, and data with low access frequency is stored in the save source external volume 42.

Meanwhile, the external storage subsystems belonging to the group 906 are mid-range or high-end storage subsystems, and data with high access frequency is stored in the save source external volume 42.

The difference in performance or usage of the external apparatus is represented in being able to set different save conditions for each group. For instance, since a low-end storage subsystem will have inferior I/O processing speed, the threshold value of the cache memory in the save source external volume of the low-end storage subsystem is set lower than the threshold value of the cache memory in the external volume of a high-end storage subsystem so that data of the cache memory is transferred to the save destination volume at an early stage.

Although FIG. 9 shows a case of grouping a plurality of external storage subsystems based on performance, the reference for grouping may also be the usage or purpose of the external storage subsystem, or the usage, purpose or characteristics of the accumulated data.

Although this example targeted a plurality of save source external volumes to be grouped, it would be preferable to avoid grouping with the, inclusion of internal volumes of the primary storage subsystem 10. This is because if the save destination volume is an internal volume of the primary storage subsystem, data needs to be save from the save source volume in the primary storage subsystem to the internal save destination volume, and this will cause an I/O load to the primary storage subsystem. Moreover, an external volume is more preferable as the save destination volume than an internal volume. This is because if the internal volume is set as the save destination, and the primary storage subsystem will be burdened with the I/O load thereof.

Figure 10:
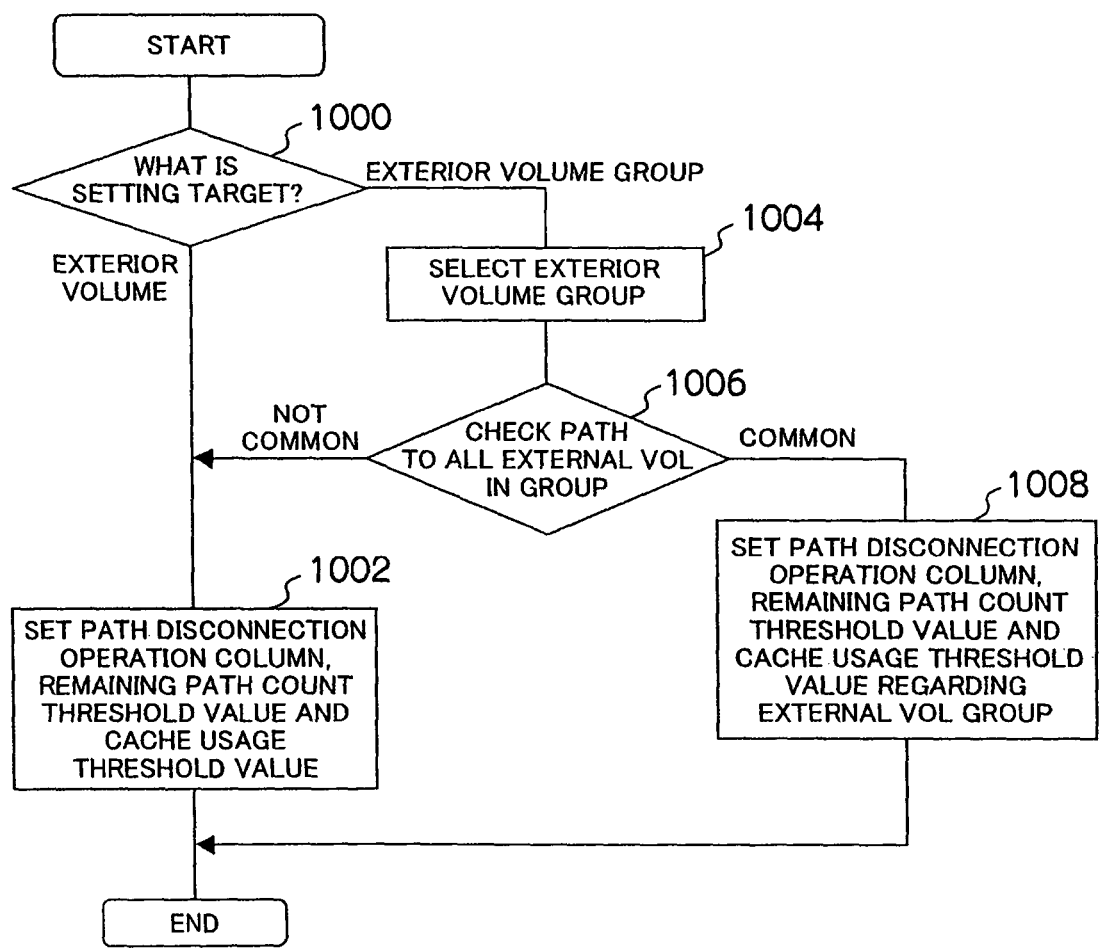
FIG. 10 is a flowchart showing the processing for setting save conditions in the management table.

The processing for setting the save conditions in the management table is now explained. FIG. 10 is a flowchart for performing this processing, and this is executed by the SVP. The SVP checks the input from the management client, and determines whether the setting target of the save conditions is the save source external volume itself, or a group of the save source external volumes (1000). The SVP proceeds to step 1002 if the setting-target of the save conditions is the save source external volume itself, and sets the operation upon path disconnection, cache utilization threshold value, and remaining path count threshold value to the external volume based in the input from the management client.

If the path mode is a single mode, save is executed at the point in time that an active path (high priority) is disconnected. If the path mode is a multi mode, save is executed when the remaining path count after the path disconnection falls below a threshold value. Save is the act of transferring the dirty data of the cache memory to an internal volume or an external volume of a save destination, or a save destination configured from a combination of such internal volume and external volume. There may be one or more save volumes.

At step 1000, if it is determined that the save source external volume group is the setting-target, the SVP selects, at step 1004, a save source external volume group from the groups (group #) registered in the management table (FIG. 8) (1004).

Subsequently, the SVP determines, at step 1006, whether the paths and path modes to the respective save source external volumes belonging to the group are the same regarding all save source external volumes by checking the management table of FIG. 3.

If the path to all external volumes in the group is not common, the SVP returns to step 1000 and sets the save conditions regarding the respective save source volumes. When referring to FIG. 2, in the group of the external volumes 3, 4 and 5, while the path to the external volume 3 is only P3, the path to the volumes 4 and 5 are both P3 and P4. Thus, this is determines that the path to the volumes 3, 4, 5 is not common. If the path is not common, it would not be suitable to set the same save conditions regarding all volumes belonging to the group.

If the path to all volumes is common at step 1006, the SVP sets the save conditions in group units at step 1008 (refer to FIG. 8). When referring to FIG. 2, the path to the volume 1 and the volume 2 is determined to be common. If the save conditions are set in group units, as described above, the SVP reflects the settings in the save conditions for each save source external volume (refer to FIG. 6).

If a plurality of external volumes across a plurality of apparatuses are grouped, the plurality of paths to the plurality of external volumes will inevitably no longer be common, and, in the determination at step 1006, the processing for setting the save conditions will be guided to step 1002, and it will not be possible to enjoy the benefits of step 1008. In this case, since it is no longer necessary to hesitate in setting the threshold value of cache utilization to be a uniform value to a plurality of external volumes that were grouped, a common threshold value may be set to the grouped plurality of external volumes between step 1004 and step 1006.

The processing for setting the save destination is now explained. FIG. 11 shows a management table of all LDEVs to become a save destination candidate. The DKA collection information on the internal volumes, and the CHA collects the external volumes which are not set as the save source external volume from the management table of FIG. 3 and to which the save conditions have not been set in FIG. 5, and registers these volume as a save destination candidate LDEVs in FIG. 11. The management table shown in FIG. 11 is registered in the shared memory 25. If the SVP selects an LDEV as the save destination, it updates the table of FIG. 11.

In FIG. 11, the column of "path definition" shows information regarding whether a path has been defined. The column of "save destination setting" shows information regarding whether the LDEV is being treated as the save destination described above. If the LDEV is an external apparatus that is not the first storage subsystem, information is registered in the column of "serial number." If no information is registered, this means that the LDEV is an internal volume; that is, a volume of the primary storage subsystem.

If the save destination volume is an external volume, a "path mode" to the external save destination volume is registered. Moreover, identifying information including the LDEV address is registered in the management table of FIG. 11.

Figure 12:
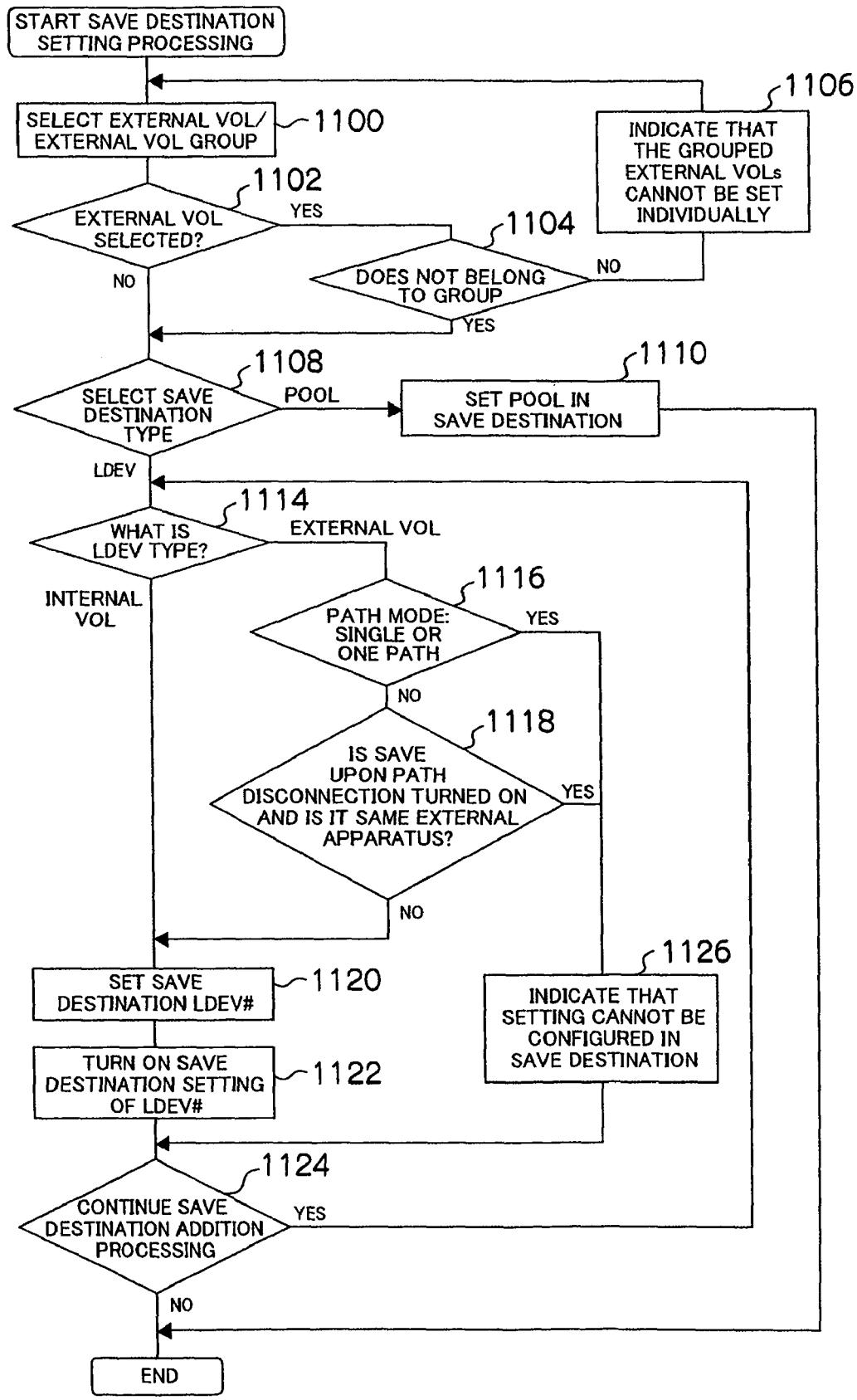
FIG. 12 is a flowchart for setting the save destination.

FIG. 12 is a flowchart for setting the save destination. This flowchart is executed by the SVP based on the input from the management client.

The SVP sets an independent external volume or an external volume group as the save source volume by referring to the management table of FIG. 5 or FIG. 8 (1100).

If an external volume is selected, the SVP proceeds from step 1102 to step 1104, and displays an indication that the grouped external volumes cannot be set individually as the save source volume on the management client (1106). This is in consideration to the fact that a status requiring the saving of data due to a path disconnection or the like may arise in group units.

If an external volume group is selected as the save source, or if an external volume not belonging to a group is selected as the save source, the SVP selects an LDEV or a pool as the save destination volume at step 1108. A pool is a volume in which the capacity is sequentially expanded based on I/O without possessing a fixed storage capacity. If a pool is selected, pool information is registered in the save destination of the external volume management table (FIG. 5, FIG. 8) (1100). A pool volume is usually set in the primary storage subsystem 20.

Figures 13, 14:
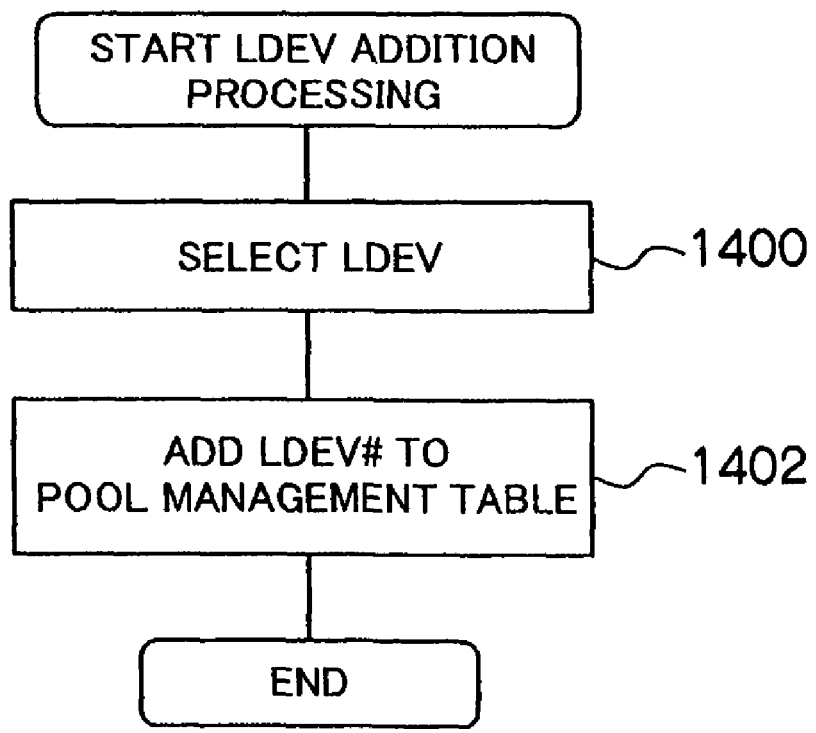
FIG. 13 is a management table for managing LDEVs registered in a pool.
FIG. 14 is a flowchart explaining the processing for adding an LDEV to a pool.

FIG. 13 is a management table for managing the LDEVs registered in the pool. FIG. 14 is a flowchart explaining the processing for adding an LDEV to a pool. When the SVP selects and LDEV that is not set as a save destination from the LDEV management table of FIG. 11 (1400), the selected LDEV # is registered in the order of the entry (#) of the pool management table of FIG. 13 (1402).

With the LDEV # registered in the pool management table, the fact that it has been selected by a pool is registered in the column of "transfer destination setting" in the LDEV management table of FIG. 11. A plurality of CHAs and DKAs treats the LDEVs registered in the pool as a save destination by sequentially allocated them to the pool.

If an LDEV is selected at step 1108, the SVP refers to FIG. 11 and determines whether the LDEV is an internal volume or an external save destination volume (1114), and registers the LDEV # in the save destination of the management table shown in FIG. 5 and FIG. 8 if it is an internal volume (1120). The detailed information of this LDEV # is registered in FIG. 11. Subsequently, the save destination setting column of the LDEV # in the LDEV management table (FIG. 11) is turned ON. Moreover, the routine returns to step 1114 when adding the setting processing of the save destination, and otherwise ends the processing (1124).

At step 1108, it is undesirable to set an LDEV, to which a path has already been set, as the save destination. Thus, the SVP displays a message to the administrator indicating that the LDEV cannot be selected as the save destination on the management client. If a path is defined in another LDEV in the same ECC group as the selected LDEV, the SVP displays a reminder on the management client. If this path definition exists, the SVP displays a message to such effect in the management table of FIG. 11. A volume of an ECC group without an I/O load, because a path is not defined therein, is preferably set as the save destination LDEV.

If an external volume is selected as the save destination at step 1114, the SVP refers to the management table of FIG. 3 and determines the path mode and path count to the save destination volume. If the path mode is a single mode or if the path count is one, the SVP displays a message on the management client to the effect that such path cannot be set as the save destination since the path has no redundancy (1126). If the path mode is single, there are case where data in the cache memory cannot be transferred to the save destination external volume during the maintenance of the external apparatus (including blockage of the HDD).

Meanwhile, the SVP proceeds to step 1118 upon obtaining a negative result in the determination at step 1116. The SVP determines whether the selected transfer destination external volume exists in the same external apparatus (same serial number and vendor name) as the save source external volume that was turned ON during the save upon path disconnection. This is because if the selected save destination external volume is in the same chassis as the save source external volume, a failure that occurred in the save source external volume may also occur in the selected save destination external volume. Subsequently, the SVP proceeds to step 1126 and, if the selected save destination external volume is not located in the same chassis, then proceeds to step 1120 since it means that the selected save destination external volume can be set as the transfer destination.

The save processing of data from the cache memory to the save destination volume is now explained. This save processing is executed when any one of the following cases occur; namely, if the amount of dirty data existing in the cache memory 24 exceeds a threshold value, if there is a path failure from the primary storage subsystem to the save source external volume, and during the maintenance of the external apparatus (including blockage of HDD) containing the save source external volume.

The save processing in a case where the save destination is an external volume is executed by the microprocessor of the CHA 21N connected to the save destination external volume. The save processing in a case where the save destination is an internal volume is executed by the DKA with the control right of the storage area of the internal volume connected to the host apparatus 10.

The CHA controlling the save calculates the total amount (cache utilization) of dirty data in the cache memory regarding the save source external volume or its group, and registers this in the cache utilization column of the external volume management table (FIG. 5, FIG. 8). The management client is able to know the current value of cache utilization by referring to the management table.

Figures 15, 16:
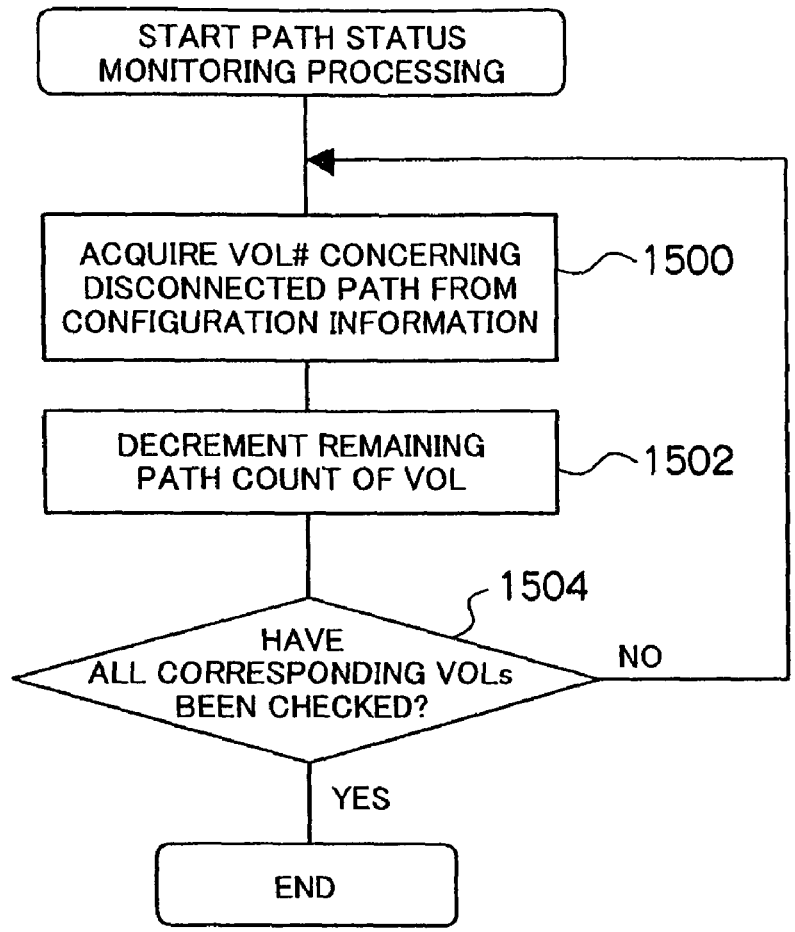
FIG. 15 shows a path status monitoring program.
FIG. 16 is a table for managing a path to a transfer source external volume and a transfer destination volume.

The channel adapter also comprises a path status monitoring program and, as shown in FIG. 15, is periodically monitoring the path status from the transfer source external volume to the transfer destination external volume. FIG. 16 shows a table for managing the paths to the transfer source external volume and the transfer destination volume. The CHAs 21A, 21B refers to the transfer source external volume management table of FIG. 3 and so on to decide the external volume #, path mode, and path count, and registers such information in the table of FIG. 16. The management table of FIG. 16 is registered in the shared memory 25. The "remaining path count" of this table is the number of normal paths in which a path failure (path disconnection) has not occurred among the path count. The remaining path count is updated based on the processing of the flowchart shown in FIG. 15.

The CHA sequentially checks the external volume # of the management table of FIG. 16, refers to the configuration information in the shared memory 25, and acquires information on the save source volume or the save destination volume subject to path disconnection (1500).

Subsequently, the remaining path count pertaining to this external volume is decremented (1502). When all external volumes of FIG. 16 are checked, this flowchart is ended.

Figure 17:
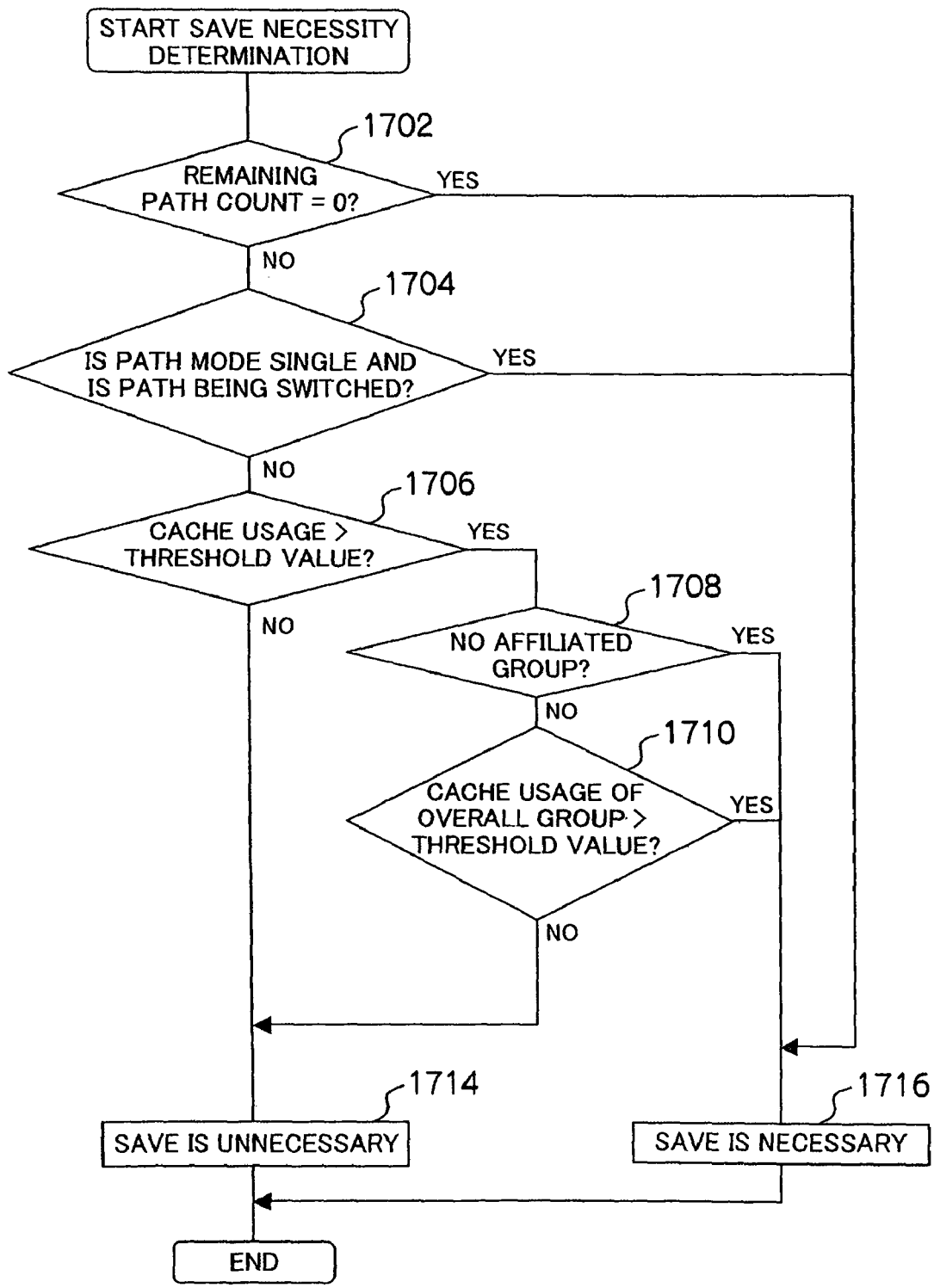
FIG. 17 is a flowchart for determining the necessity of save processing.

FIG. 17 is a flowchart for determining the necessity of save processing. The CHAs 21A, 21B connected to the save source external volume follow this flowchart regarding all save source external volumes.

Foremost, the CHA compares the path count and the remaining path count. The "path count" shows the number of paths formed from the primary storage subsystem to the save source external volume, and the "remaining path count" shows the number of paths excluding those that were disconnected from the path count as described above.

Foremost, the CHA refers to the management table of FIG. 3, and determines whether the "remaining path count" is zero (1702). If the remaining path count is zero, it proceeds to step 1716 since the path has no redundancy, and determines this as "save necessary." If the remaining path count is not zero, the CHA proceeds to step 1704, and determines whether the path mode is single and whether a path with high priority is being switch to an alternate path with low priority. If the CHA obtains a positive result in this determination, it proceeds to step 1716.

The process from step 1702 and step 1704 to step 1716 is now explained in detail with reference to other diagrams.

Figure 18A:
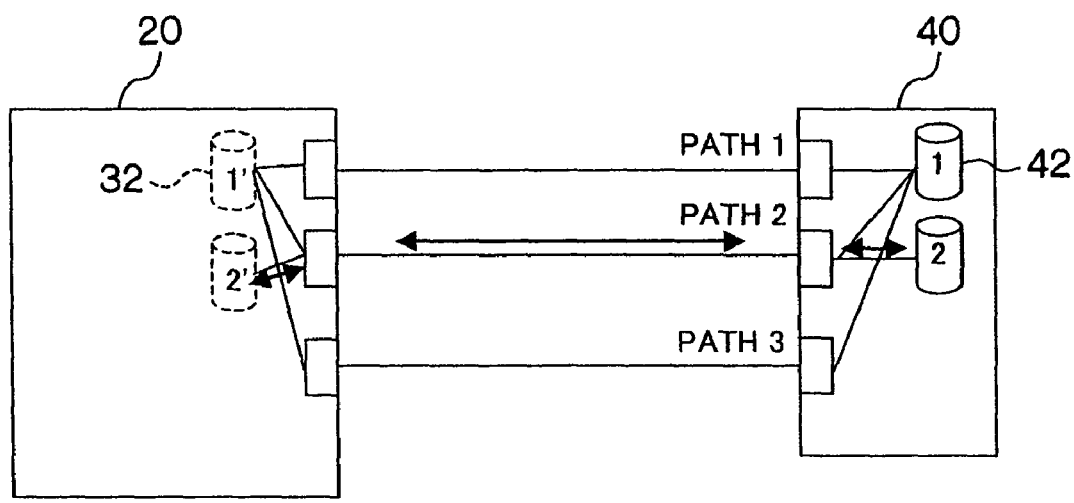
FIGS. 18A and 18B are a block diagram explaining the save processing upon path disconnection.
Figure 18B:
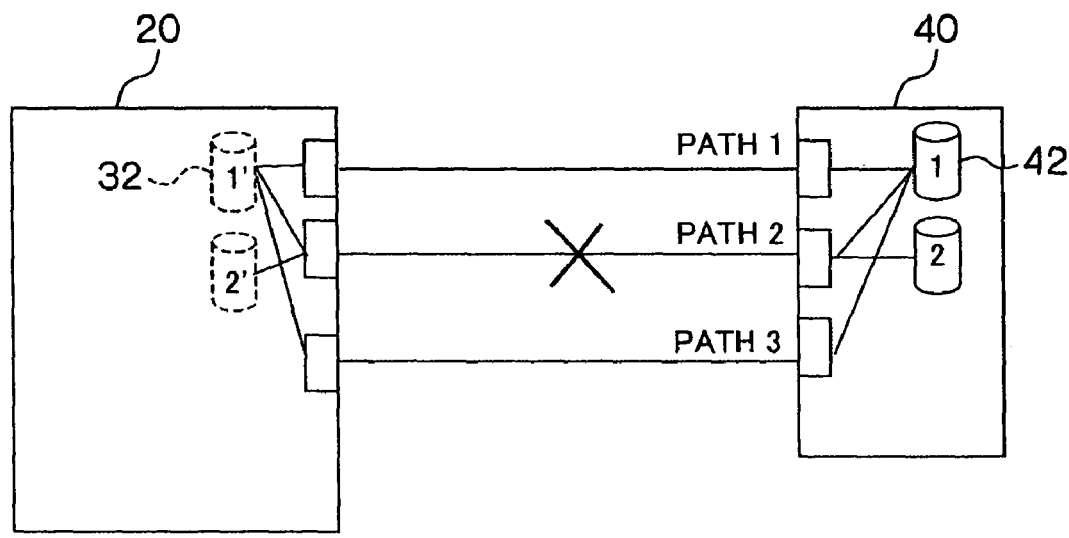

In FIG. 18A, the path count to the save source external volume 2 is "1" that passes through "path 2." As shown in FIG. 18B, since the "remaining path count" will become "0" if the "path 2" is disconnected, it is determined that the dirty data of the cache memory needs to be saved in the save destination volume regarding the save source external volume 2.

Figure 19A:
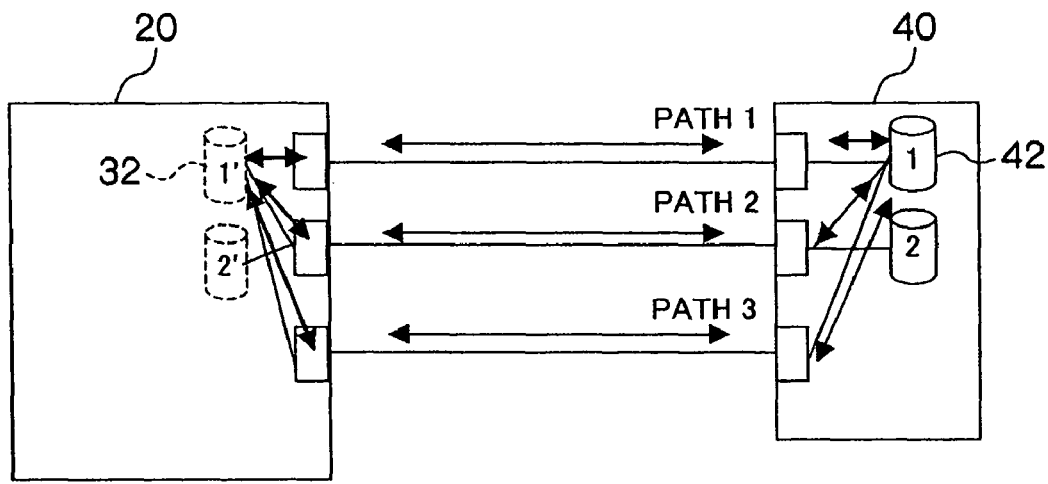
FIGS. 19A and 19B are a block diagram explaining another example of save processing.
Figure 19B:
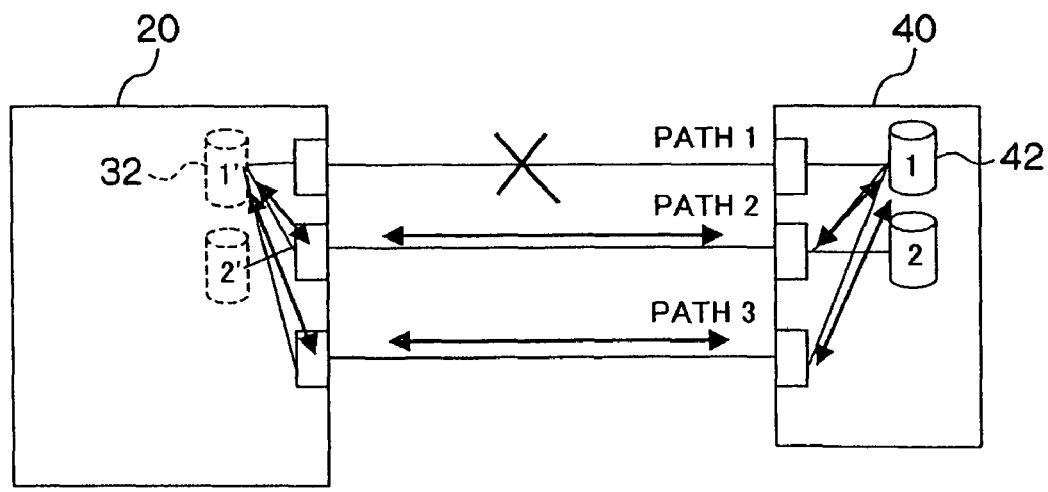

In FIG. 19A, the path count to the save source external volume 1 is "3" that respectively passes through the paths 1 to 3. The paths 1 to 3 to the save source external volume 1 are operated in a multi path mode. Here, as shown in FIG. 19B, the "remaining path count" is "2" even if "path 1" is disconnected, and since the path mode is single and not being switched, it is not necessary to save the dirty data.

Figure 20A:
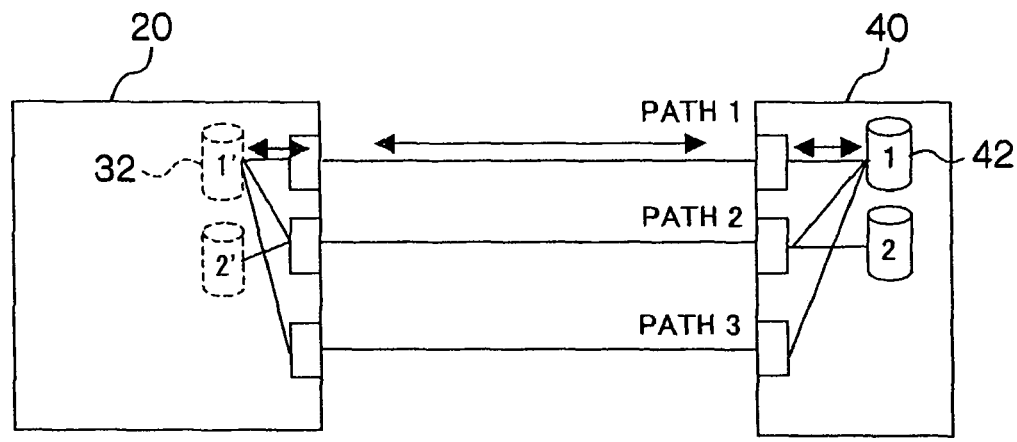
FIG. 20A to 20C are a block diagram explaining yet another example.
Figure 20B:
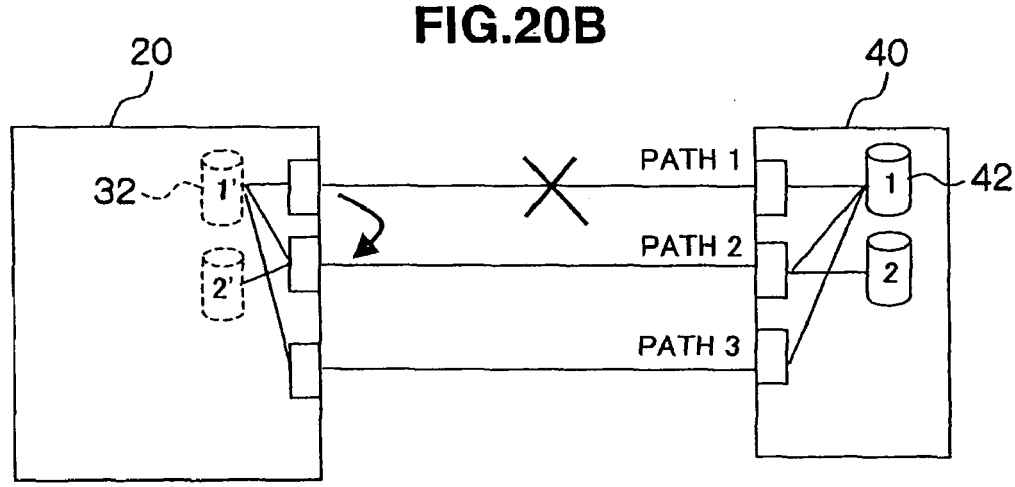
Figure 20C:
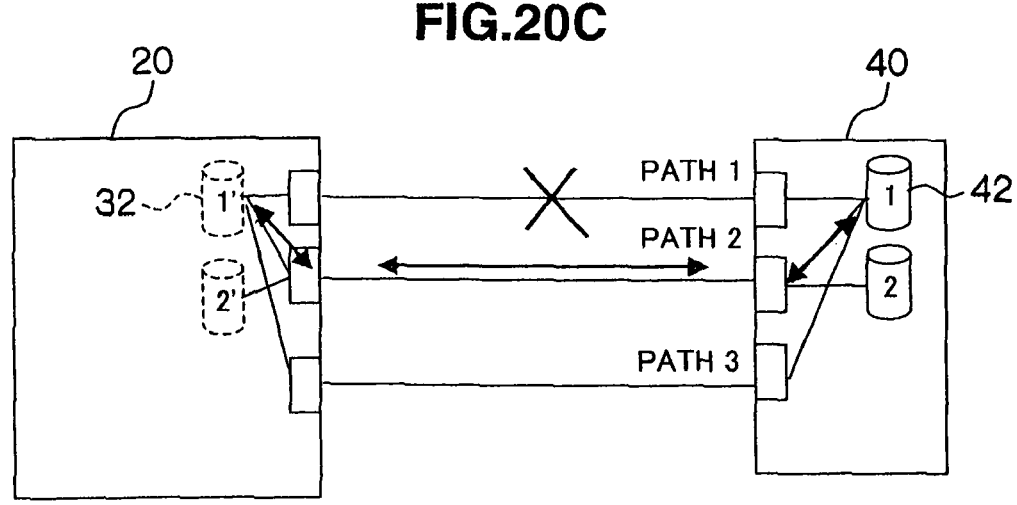

In FIG. 20A, the path count to the save source external volume 1 is "3" that respectively passes through the paths 1 to 3. The path 1 to the save source external volume 1 is operated as an active path in single mode. Here, as shown in FIG. 20B, if "path 1" is disconnected, although the "remaining path count" is "2," "path 1" is switched to "path 2"; that is, it is determined that saving of the dirty data is necessary since it is necessary to make "path 2" the active path. Meanwhile, as shown in FIG. 20C, if "path 2" is the active path, it is determined that saving of the dirty data is unnecessary if only "path 1" is disconnected.

Returning to FIG. 17 to continue the explanation, if save is determined to be unnecessary at step 1702 and step 1704, the CHA compares, at step 1706, the cache utilization and the threshold value of the virtual volume corresponding to the save source external volume. If the cache utilization is below the threshold value, the CHA determines that saving is unnecessary.

Meanwhile, if the cache utilization exceeds the threshold value, the CHA refers to the management table of FIG. 5, and determines whether there is a group to which the save source external volume belongs (1708). If the CHA obtains a negative result in this determination, it compares the overall utilization of the cache including the other save source external volumes belonging to that group and the threshold value of that group at step 1710 (1710). These values can be obtained by referring to the management table of FIG. 8. Even if the cache utilization regarding a specific save source external volume exceeds the threshold value of that volume, if it does not exceed the threshold value regarding the overall volume of the group, it is determined that save is unnecessary.

Meanwhile, if it is determined at step 1708 that there is no group to which the save source external volume belongs (YES), or if the total cache utilization of all volumes belonging to that group exceeds the threshold value at step 1710 (YES), it is determined that save is unnecessary (1716).

The processing of destaging data remaining in the cache memory to the save destination volume, or destaging data in the cache memory to the save source external volume is now explained. Whether the dirty data of the cache memory is saved in the save destination volume is managed by the save destination management table of FIG. 21 and the bitmap of FIG. 22.

Figures 21, 22:
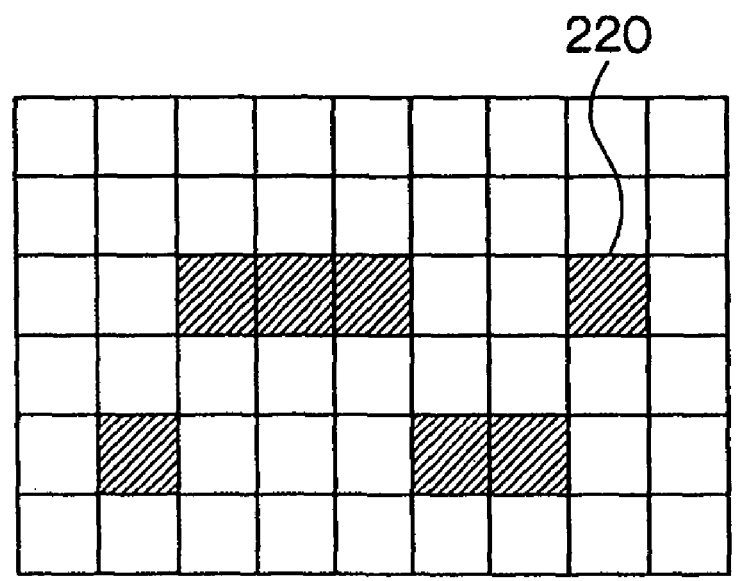
FIG. 21 shows a save destination management table.
FIG. 22 is a bitmap for managing the save destination.

Each management # in the save destination management table of FIG. 21 corresponds to the individual slots obtained by partitioning the storage area of the save source external volume into slot units. The LDEV # is information for specifying or identifying the save destination volume, and the save destination # is an address in the LDEV # where the save data exists.

FIG. 22 is a bitmap table, and each bit corresponds to the administrator # of FIG. 21. If the save destination is registered in the management #, the bit corresponding to that management # is turned ON. FIG. 22 shows that the bit 220 has been turned ON. If the bit is turned OFF, this shows that the data is reflected in the corresponding slot location of the save source external volume, and not the save destination. The channel adapter sets and updates the save destination management table and the bitmap. The save destination management table and the bitmap are stored in the shared memory 25.

Figure 23:
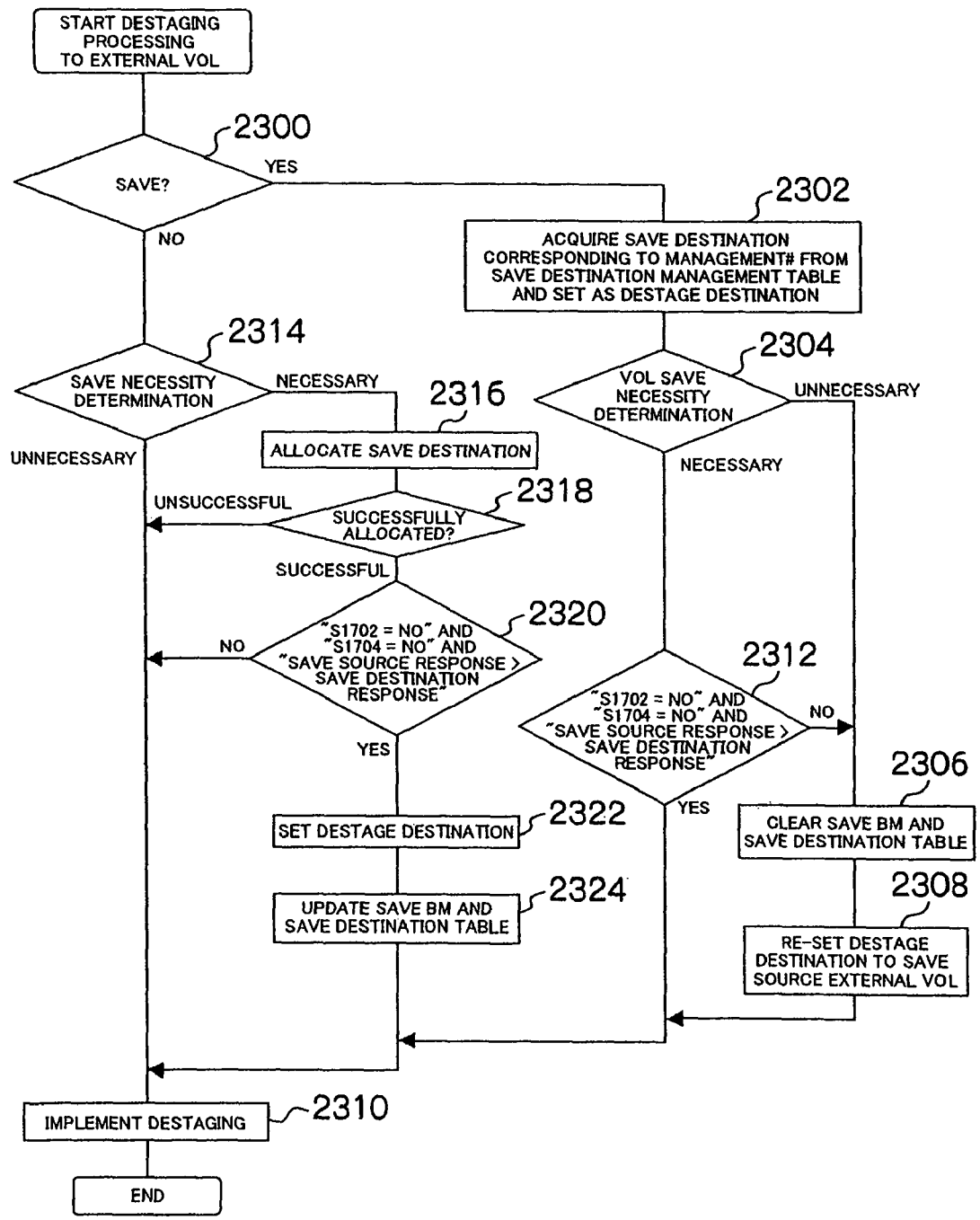
FIG. 23 is a flowchart explaining the destaging processing.

FIG. 23 is a flowchart explaining the destaging processing to be executed by the CHA and/or DKA. The CHA calculates to which slot location of the save source external volume the data of the cache memory is to be destaged. The channel adapter seeks the management # of this slot, and determines whether the bit is turned ON by checking the bit of the bitmap corresponding to the management #. If the bit is turned ON, save is determined to be necessary. If save is to be performed (2300), the save destination information is read from the management # of the save destination management table, and this save destination is set as the destination for destaging the data of the cache memory (2302).

Subsequently, if save is unnecessary based on the processing result of the save necessity determination of FIG. 17 (2304), since the CHA is able to transfer the data of the cache memory to the save source external volume, it clears the bit of the bitmap and the save destination management table; that is, it turns of the bit and clears (sets NULL in) the save destination of the save destination management table (2306). The slot corresponding to the management # of the save source volume is thereafter re-set as the destage destination (2308). Subsequently, the CHA destages the dirty data of the cache memory to the save source external volume.

Meanwhile, if save is determined as necessary, at subsequent step 2312, whether "Step 1702 of FIG. 17=No and Step 1704 of FIG. 17=No and Average value of I/O response to save source volume>save destination volume" is positive or negative is determined. If a negative result is obtained in this determination, the I/O load to the save destination volume is determined to be high, and the routine proceeds to step 2306 and sets the save source external volume as the destage destination.

Meanwhile, if a positive result is obtained in the determination at step 2312, the save destination volume is maintained as the destage destination. Subsequently, the CHA destages data of the cache memory with the save destination volume as the destage destination (2310).

Meanwhile, if it is determined that there is no save destination at step 2300, the save necessity determination is performed based on the processing result of FIG. 17 at step 2314. If save is unnecessary, dirty data of the cache memory is destaged to a specific slot of the save source external volume.

If save is determined as necessary at step 2314, the CHA attempts to allocate the save destination (2316), and determines whether the save destination allocation was successful or unsuccessful (2318). If the allocation is determined to be successful, at step 2322, the same processing as step 2312 is performed. If a positive result is obtained in the determination of this processing, the save destination is set as the destage destination (2322), a specific bit of the save bitmap is turned ON, and the save destination is registered in a specific management # of the save destination management table (2324). Whether the save destination allocation was successful or unsuccessful is determined based on the flowchart explained later.

Meanwhile, if a negative result is obtained in the determination at step 2322, destaging is performed to a specific slot of the save source external volume. The CHA periodically calculates the average value of the I/O response regarding the save destination external volume and the save source external volume based on another flowchart. If the save destination volume is an internal volume, the DKA seeks the I/O response of the save destination internal volume.

Figure 24:
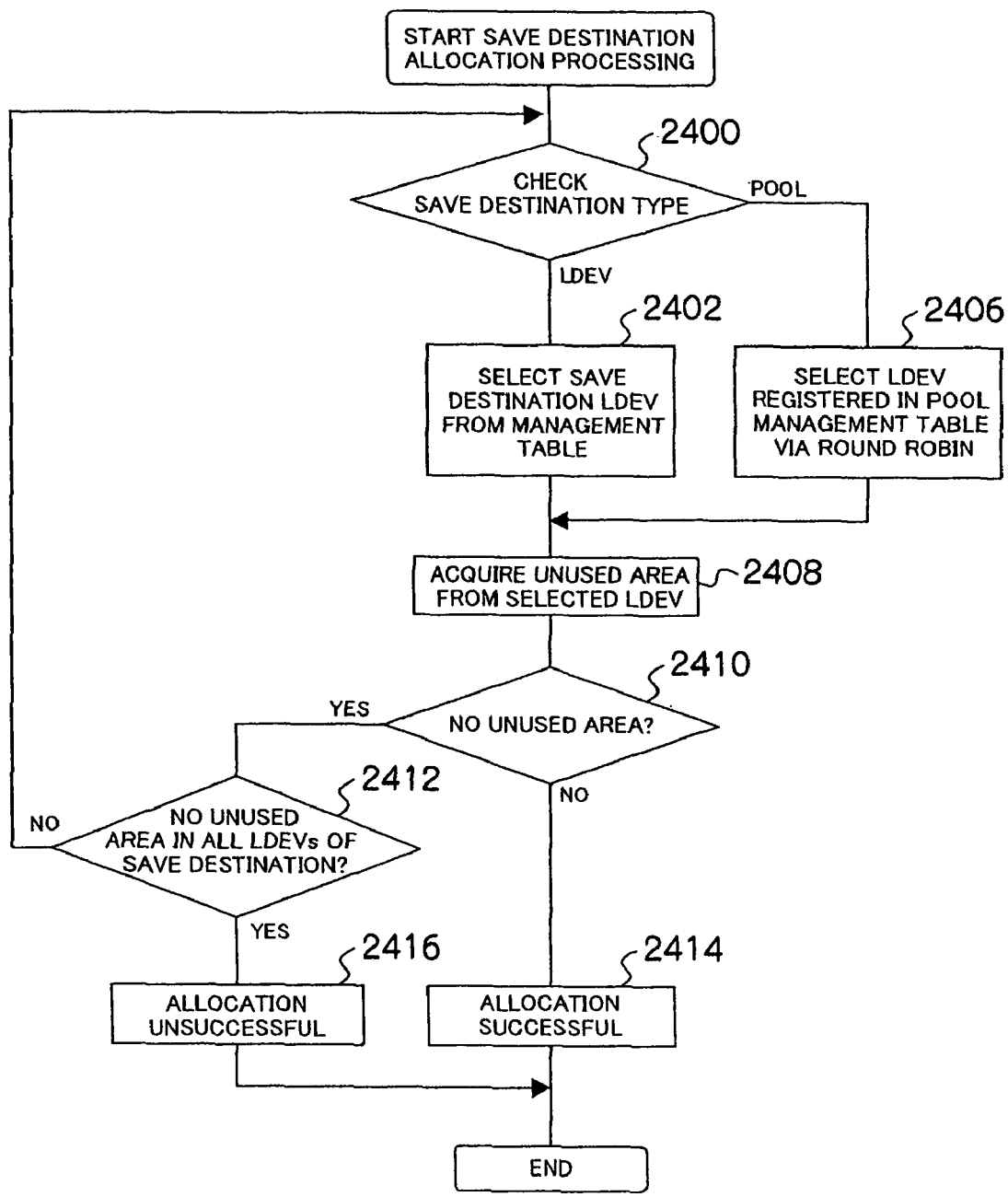
FIG. 24 is a flowchart for the primary storage subsystem to allocate the save destination.

FIG. 24 explains the processing for the primary storage subsystem 20 to allocate the save destination. The CHA refers to the save source external volume management table (FIG. 5, FIG. 8), and determines whether the save destination is a pool or an LDEV. If the save destination is a pool, the CHA refers to the pool management table (FIG. 13), and selects via round robin one LDEV among the plurality of LDEVs registered in that table (2306).

Meanwhile, if the save destination is an LDEV that is not a pool, the CHA selects and LDEV that is set as the save destination in the external volume management table (2402). If a plurality of LDEVs are registered in the management table, one LDEV is selected via round robin.

Subsequently, the CHA attempts to acquire an unused area from the selected LDEV (2408). The existence or non-existence of an unused area is determined at step 2410 and, if an unused area exists, the save destination allocation is determined to be successful (2414). Meanwhile, if there is no unused area in the selected LDEV, the CHA determines whether there is an unused area regarding all LDEVs registered in the management table as a save destination (2412). If the CHA obtains a negative result in this determination, it returns to step 2400, and if the CHA obtains a positive result in this determination, it determines that the save destination allocation was unsuccessful (2416).

Figure 25:
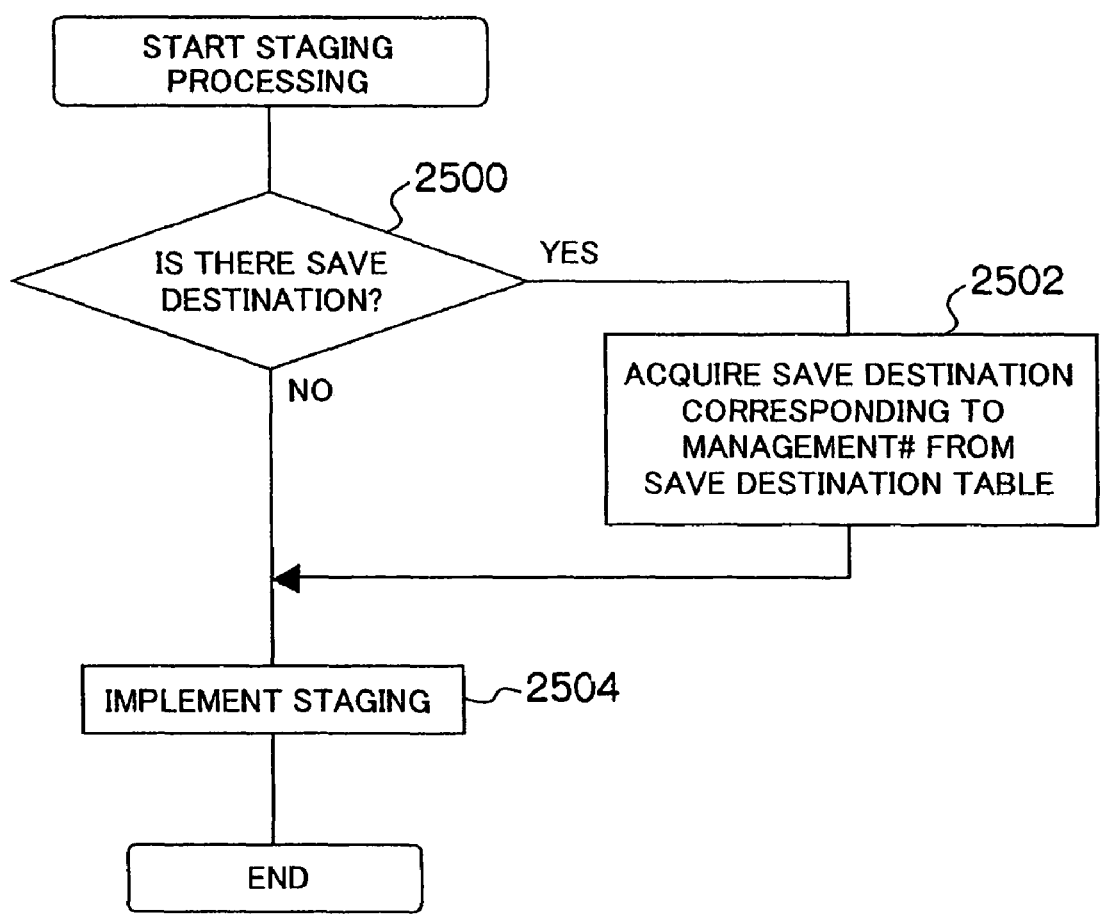
FIG. 25 is a flowchart explaining the staging processing.

The staging processing to the cache memory is now explained with reference to FIG. 25. When the CHA receives a read request from the host apparatus 10 to the virtual volume 32, it refers to the cache memory and performs a cache hit/miss determination. If the CHA determines a cache hit, it reads that data from the cache memory 24 and transfers it to the host apparatus 10.

Meanwhile, if the CHA determines a cache hit/miss, the CHA 21A connected to the save source external volume reads a read command from the shared memory 25, seeks the management # corresponding to the read destination slot of the save source external volume, checks the bitmap (FIG. 22) corresponding to that management #, and checks whether there is a save destination (2500).

If there is no save destination, the CHA reads data from the save source external volume and stages such data to the cache memory (2504). Meanwhile, if there is a save destination, the CHA acquires the save destination from the management # of the save destination management table (FIG. 21) (2502), and acquires data from the save destination and stages such data to the cache memory (2504). The staged data is transferred to the host apparatus by the channel adapter.

Figure 26:
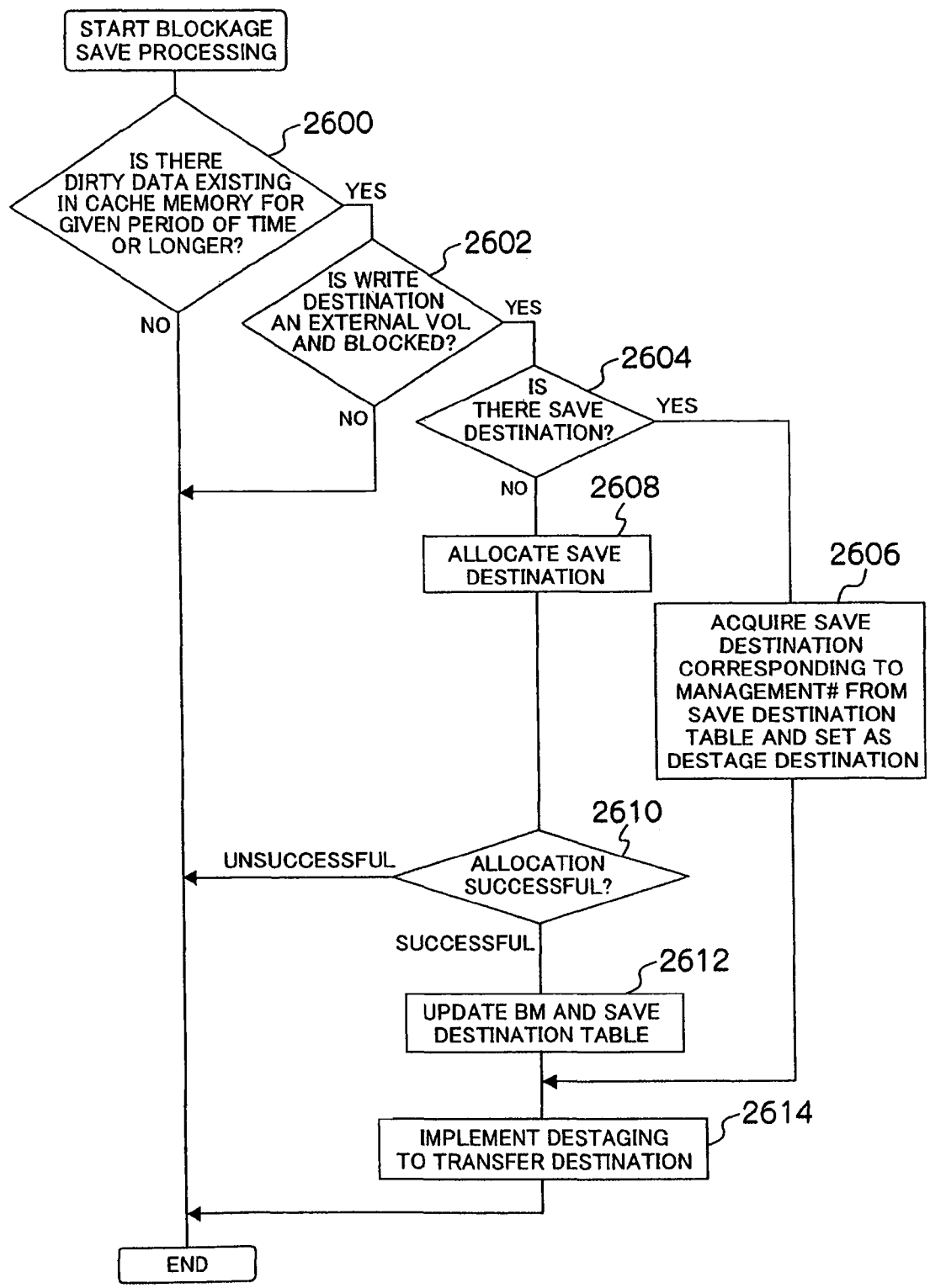
FIG. 26 is a flowchart of the data save processing in a case where a failure occurs in the HDD of an external apparatus and such failed HDD is to be blocked.

The save processing of data in a case where a failure occurred in the HDD of the external apparatus providing the save source external volume and such HDD is to be blocked is now explained with reference to the flowchart of FIG. 26. The CHA connected to the save source external volume checks the cache memory 24, and checks whether there is dirty data that has been existing in the cache memory for a given period of time (2600).

If a negative result is obtained in this determination, this flowchart is ended since it is not necessary to save data in connection with the blockage of the HDD. Meanwhile, if a positive result is obtained in this determination, whether the write destination of the dirty data is the save source external volume and whether the drive providing the storage area of such volume is being blocked are checked (2602). If a negative result is obtained in this determination, this flowchart is ended since it is not necessary to allocate the save destination. Meanwhile, if the HDD is blocked, a positive result is obtained in the determination at step 2602, and it is necessary to save the dirty data identified at step 2600 to another volume.

Thus, the CHA determines whether a transfer destination has been set to the dirty data based on the transfer destination management table (FIG. 21) and the bitmap (FIG. 22) (2604). If a positive result is obtained in this determination, the CHA acquires the save destination from the transfer destination management table, sets this as the destage destination (2606), and performs destaging processing to the transfer destination. If the save destination is an external volume, the CHA connected to that external volume performs the destaging. Meanwhile, if the save destination volume is an internal volume, a DKA capable of accessing the internal volume performs the destaging (2614).

If a positive result is obtained in the determination at step 2604, the respective processing of save destination allocation (2608) and save destination allocation successful/unsuccessful determination (2610) are performed. If the save destination allocation is unsuccessful, this is notified to the SVP. The SVP displays necessary messages on the management client.

Meanwhile, it the save destination allocation is successful, the save destination management table (FIG. 21) and the bitmap (FIG. 22) are updated, and destage processing is performed to the save destination (2614).

Figure 27:
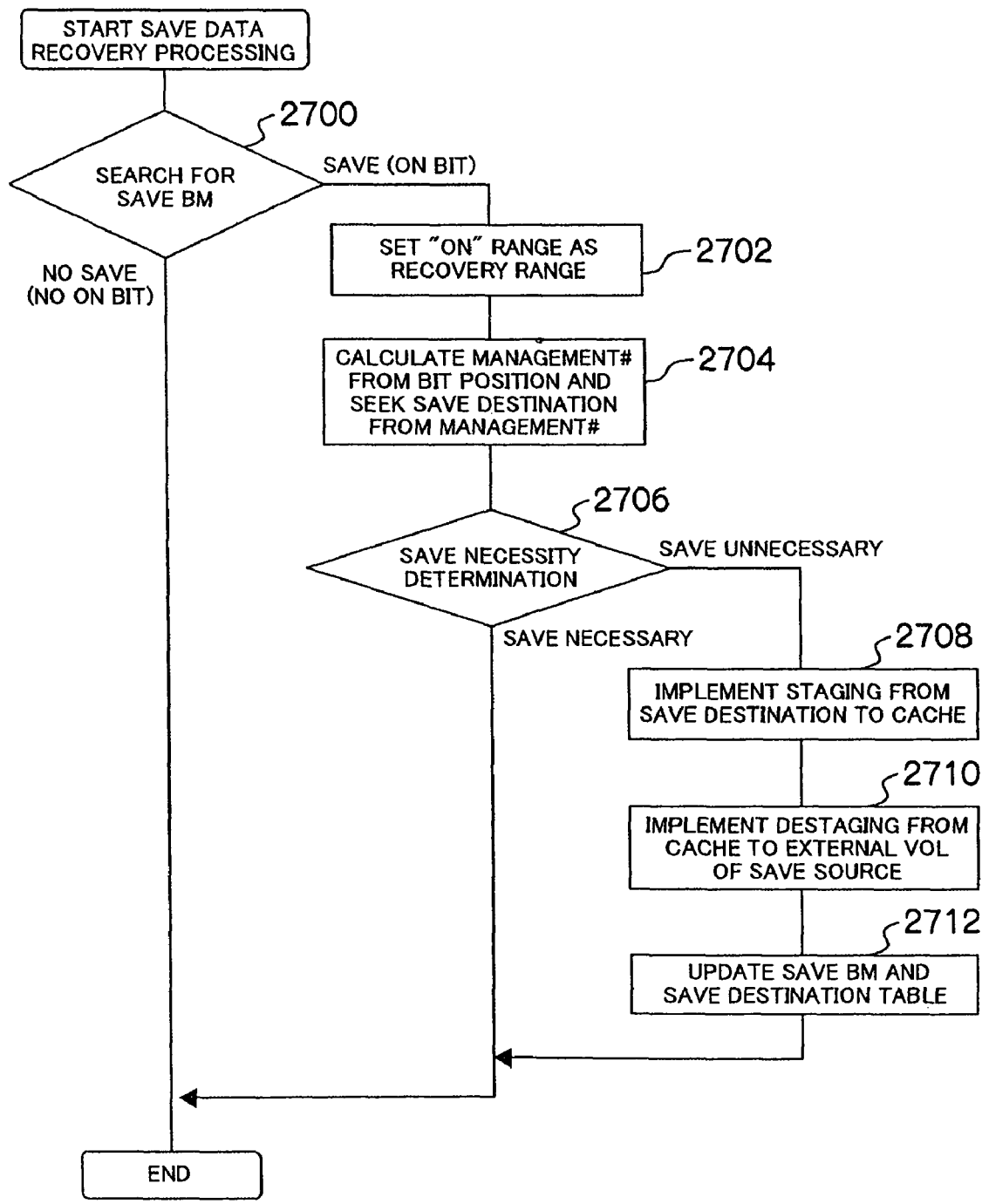
FIG. 27 is a flowchart explaining the recovery processing for restoring save data from the save destination volume to the save source external volume.

The recovery processing for restoring the save data from the save destination volume to the save source external volume is now explained with reference to FIG. 27. The CHA 21A searches for a bitmap shown in FIG. 22 regarding the save source external volume (2700), and determines whether there is save (ON bit) or no save (no ON bit). The CHA sets the ON bits as the range that needs to be recovered, and seeks the save destination from the management # corresponding to the ON bits.

Subsequently, the CHA determines the save necessity based on the results of the flowchart of FIG. 17 regarding the save source external volume (2706). If save is necessary, the flowchart is ended without recovering the save data since data cannot be transferred from the save destination to a specific slot of the save source external volume. Meanwhile, if save is unnecessary, since the recovery of the save data is possible, save data is staged from the save destination to the cache memory (2708).

Subsequently, the CHA destages (restores) the staged data to the save source external volume as the recovery destination (2710), clears information of the save source management # of the save management table, and clears the ON bits of the bitmap (2712). When recovering the save data to the save source external volume, the bits that are sequentially ON in the bitmap are given priority. This is because the transfer of the save data to the save source external volume will become sequential processing that is performed efficiently.

Figure 28:
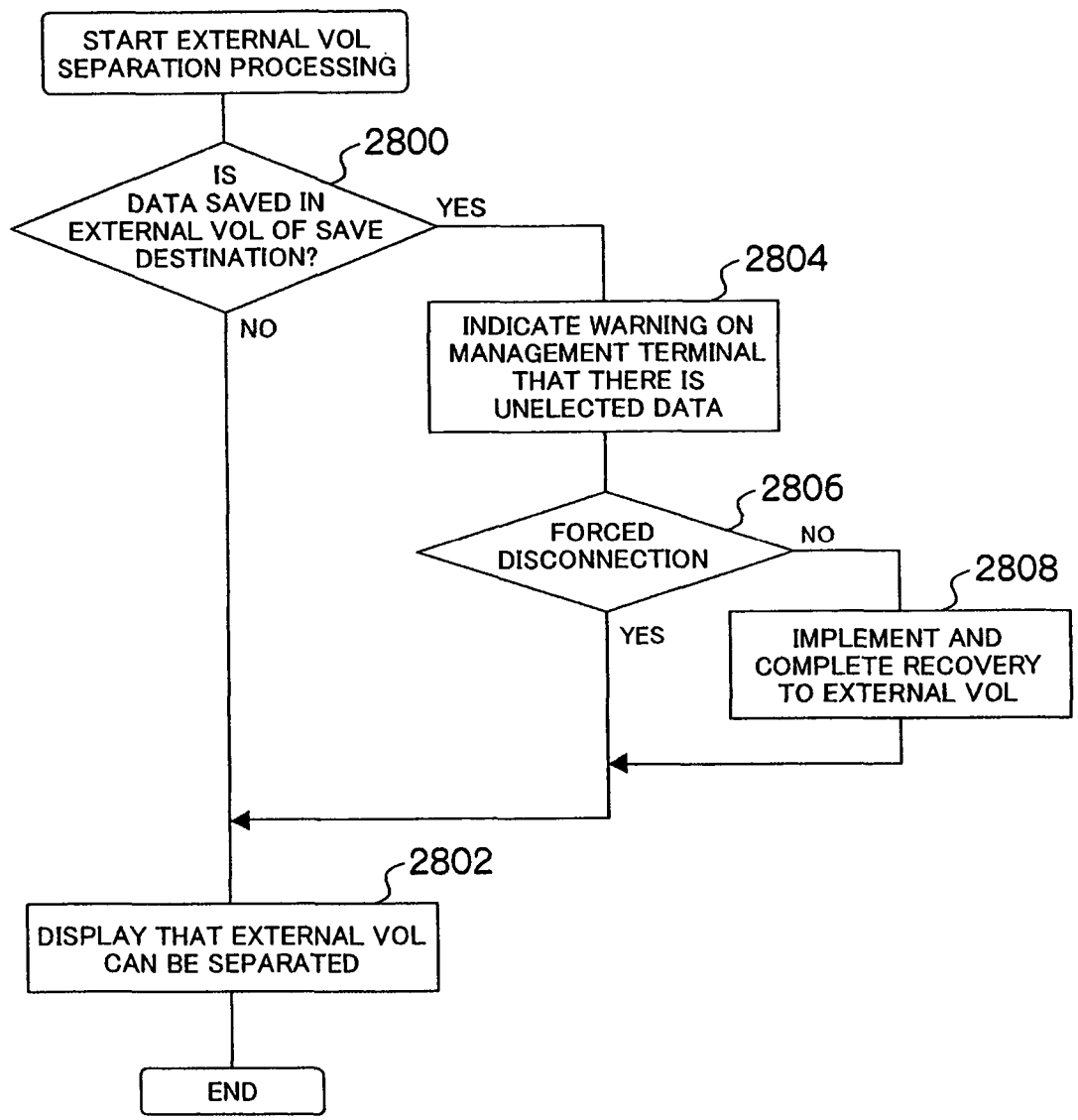
FIG. 28 is a flowchart explaining the processing of separating the save destination external volume from the primary storage subsystem.

The processing to be performed when releasing a path from the primary storage subsystem to the save destination external volume or when separating the external apparatus including the save destination external volume from the primary storage subsystem is now explained with reference to FIG. 28.

The CHA 21N refers to the save destination management table and the bitmap, and determines whether there is save data in the external volume to be separated from the primary storage subsystem (2800). The CHA recognizes this external volume based on a notice from the SVP.

If it is determined that there is no save data at step 2800, the CHA notifies the management client to the effect that the external volume can be separated via the SVP. The management client displays a message to the administrator to confirm whether to execute the disconnection of the volume.

If there is save data, the CHA, at step 2804, notifies the management client via the SVP that there is data in the external volume to be disconnected which has not yet been reflected in the save source external volume (2806).

The SVP requests the management client to confirm the necessity of forced disconnection of the external volume (2806). If forced disconnection is permitted, a message indicating that the disconnection of the external volume is possible is displayed on the management client at step 2802 (2802). Meanwhile, if the administrator selects the recovery processing of the save data, the CHA immediately executes the flowchart of FIG. 27, and restores the save data of the external volume to the save source external volume (2808).

Figure 29:
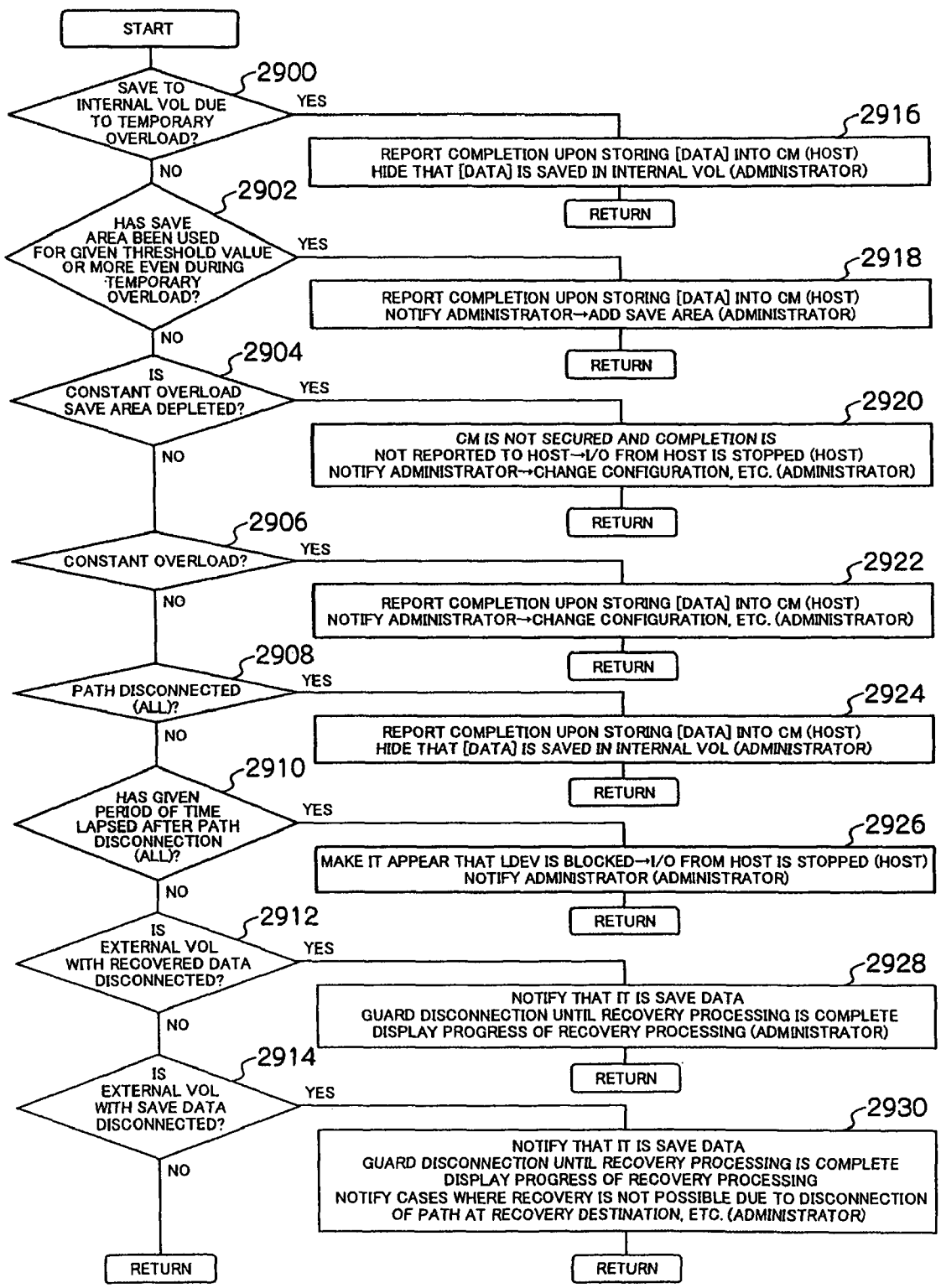
FIG. 29 is a flowchart concerning the notices to be sent to the host apparatus and the administrator during an overload of the save source external volume, saving of data and path disconnection.

FIG. 29 is a flowchart concerning the notices to be sent to the host apparatus and the administrator during an overload of the save source external volume, saving of data and path disconnection. Since the external volume is shown to the host apparatus as a volume of the primary storage subsystem 20, influence from a temporarily failure or maintenance of the external apparatus is handled by the storage subsystem as much as possible and not shown to the host. For instance, since the data of the cache memory will be saved even if a path is disconnected, the time until the host is shown that the LDEV is blocked can be extended by employing the present invention.

The foregoing embodiment explained that the internal volume and the external volume of the primary storage subsystem can be used as the save destination volume. Although the use of an internal volume as the save destination volume may affect the I/O processing of the storage subsystem due to the I/O load on the internal volume upon saving data to the internal volume, there are the following advantages.

Specifically, if an internal volume is used as the save destination volume, since the performing of an internal volume is superior to an external volume from the perspective of system configuration, high-speed processing is enabled by saving data to the internal volume if the load to the external resources in the external volume is high, and the overload of the cache memory can be avoided easily.

Meanwhile, if an external volume is used as the save destination volume, there are many cases where the use of the save destination volume is restricted due to phenomena unique to external volumes such as path disconnection or maintenance of the external apparatus, and the performance of an external volume is often inferior to an internal volume from the perspective of system configuration. Thus, while the save destination external volume may become overloaded, there is an advantage in that the I/O processing performance of the primary storage apparatus will not be affected upon saving data to the volume.

What is claimed is:

1. A storage system, comprising:
   a first volume to be accessed by a host computer;
   a second volume mapped to the first volume;
   a cache memory for temporarily storing write data sent from the host computer to the first volume;
   a third volume to be used for saving write data of the cache memory;
   a controller for controlling the transfer of the write data; and
   a management memory storing a rule for deciding whether to transfer write data of the cache memory to the third volume;
   wherein the controller controls whether to transfer the write data, which was not transferred to the second volume and is remaining in the cache memory based on the rule stored in the management memory, to the third volume based on the transfer rule,
   wherein the controller transfers the write data from the cache memory to the third volume if the transfer of the write data from the cache memory to the second volume is a status that conforms to the rule, and transfers the write data from the cache memory to the second volume if the transfer is a status that does not conform to the rule, and
   wherein the controller determines that a status conforms to the rule when the capacity of the cache memory used by write data existing in the cache memory without being transferred to the second volume exceeds a threshold value, and thereby saves the write data in the third volume.

2. The storage system according to claim 1,
   wherein the first volume is a virtual area that is recognizable by the host computer but without a storage area;
   wherein the second volume comprises an area capable of storing the write data of the cache memory; and
   wherein the third volume comprises an area for storing the write data.

3. The storage system according to claim 1, further comprising:
   a primary storage subsystem including the first volume, the cache memory, the management memory, and the controller; and
   an external storage subsystem including the second volume;

wherein the controller transfers the write data sent from the host system to the first volume to the second volume via the cache memory, and wherein the third volume exists at least in either the primary storage subsystem or the external storage subsystem.

4. The storage system according to claim 3, wherein the external storage subsystem exists in a plurality;

wherein each of the plurality of external storage subsystems comprises one or more of the second volumes; and wherein the storage system further comprises a management apparatus for collectively setting the rule to each of the plurality of external storage subsystems.

5. The storage system according to claim 3, wherein the external storage subsystem exists in a plurality;

wherein each of the plurality of external storage subsystems comprises one or more of the second volumes;

wherein the plurality of external storage subsystems are separated into a plurality of groups according to performance; and wherein the storage system further comprises a management apparatus for collectively setting the rule to each of the plurality of groups.

6. The storage system according to claim 1, wherein the rule is an overload status of the second volume; and wherein, if the controller determines that the second volume conforms to the rule, the controller transfers the write data that was not transferred to the second volume and is remaining in the cache memory to the third volume and not to the second volume.

7. The storage system according to claim 1, further comprising:

a primary storage subsystem including the first volume, the cache memory, the management memory, and the controller; and an external storage subsystem including the second volume;

wherein the controller transfers the write data sent from the host system to the first volume to the second volume via the cache memory;

wherein the third volume exists in the external storage subsystem;

wherein the rule is that a failure occurs in at least one of a plurality of paths the between the primary storage subsystem and the external storage subsystem that connect the second volume and the third volume; and wherein, upon determining the failure, the controller transfers the write data from the cache memory to the third volume and not to the second volume.

8. The storage system according to claim 7, wherein, if the plurality of paths are set to a single path mode, the controller saves the write data from the cache memory to the third volume upon determining, as the failure, that a path with high priority among the plurality of paths was disconnected.

9. The storage system according to claim 7, wherein, if the plurality of paths are set to a multi mode, the controller saves the write data from the cache memory to the third volume upon determining, as the failure, that at least one path among the plurality of paths was disconnected and the remaining path count is smaller than a threshold value.

10. The storage system according to claim 1, wherein the second volume exists in a plurality; and the rule is decided for each of the plurality of second volumes.

11. A storage subsystem for providing a storage area to a host computer, comprising:

a virtual area to be accessed by the host computer;

a first storage area for temporarily storing write data sent by the host computer to the virtual area;

a first memory storing information for mapping a second storage area of an external storage to the virtual area;

a first controller for transferring the write data from the first storage area to the second storage area based on the mapping information;

a second controller for determining a condition for saving the write data temporarily stored in the first storage area from the first storage area, allocating a third storage area upon determining that the condition is satisfied, and transferring the write data temporarily stored in the first storage area to the third storage area; and a second memory recording information on whether the destage destination of the write data from the first storage area is the second storage area or the third storage area, wherein the second controller transfers the write data from the first storage area to the third storage area if the transfer of the write data from the first storage area to the second storage area is a status that satisfies the condition, and the first controller transfers the write data from the first storage area to the second storage area if the transfer is a status that does not satisfy the condition, and wherein the second controller determines that a status satisfies the condition when the capacity of the first storage area used by write data existing in the first storage area without being transferred to the second storage area exceeds a threshold value, and thereby saves the write data in the third storage area.

12. A storage control method, wherein a storage subsystem performs:

a step of showing a virtual storage area to a host system;

a step of receiving data sent from the host system to the virtual storage area;

a step of temporarily storing the write data in a cache memory;

a step of transferring the write data stored in the cache memory to an external real storage area mapped to the virtual storage area;

a step of determining a condition for saving the write data from the cache memory; and a step of affirming the condition and allocating a first save destination and a second save destination for saving the write data stored in the cache memory, wherein the write data is transferred from the cache memory to the second save destination if the transfer of the write data from the cache memory to the first save destination is a status that satisfies the condition, and the write data is transferred from the cache memory to the first save destination if the transfer is a status that does not satisfy the condition, and wherein a status satisfying the condition is determined when the capacity of the cache memory used by write data existing in the cache memory without being transferred to the first save destination exceeds a threshold value.

* * * * *